US010594562B1

(12) United States Patent
Rastogi et al.

(10) Patent No.: US 10,594,562 B1
(45) Date of Patent: Mar. 17, 2020

(54) INTELLIGENT AUTOSCALE OF SERVICES

(71) Applicant: VMware, Inc., Palo Alto, CA (US)

(72) Inventors: Gaurav Rastogi, San Francisco, CA (US); Raju Kumar, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 386 days.

(21) Appl. No.: 15/130,499

(22) Filed: Apr. 15, 2016

Related U.S. Application Data

(60) Provisional application No. 62/209,729, filed on Aug. 25, 2015.

(51) Int. Cl.
*H04L 12/24* (2006.01)
*H04L 29/08* (2006.01)

(52) U.S. Cl.
CPC ...... *H04L 41/0896* (2013.01); *H04L 41/0886* (2013.01); *H04L 41/147* (2013.01); *H04L 41/5019* (2013.01); *H04L 67/10* (2013.01)

(58) Field of Classification Search
CPC ............. H04L 41/0896; H04L 41/0886; H04L 41/147; H04L 41/5019; H04L 67/10
See application file for complete search history.

(56) References Cited

U.S. PATENT DOCUMENTS 5,109,486 A 4/1992 Seymour
5,781,703 A 7/1998 Desai et al.
6,148,335 A 11/2000 Haggard et al.
6,449,739 B1 9/2002 Landan
6,515,968 B1 2/2003 Combar et al.
6,714,979 B1 3/2004 Brandt et al.
6,792,458 B1 9/2004 Muret et al.
6,792,460 B2 9/2004 Oulu et al.
6,901,051 B1 5/2005 Hou et al.
6,996,778 B2 2/2006 Rajarajan et al.
7,246,159 B2 7/2007 Aggarwal et al.
7,353,272 B2 4/2008 Robertson et al.
7,430,610 B2 9/2008 Pace et al.
7,933,988 B2 4/2011 Nasuto et al.
8,112,471 B2 2/2012 Wei et al.
8,588,069 B2 11/2013 Todd et al.
8,856,797 B1 * 10/2014 Siddiqui .................. G06F 9/46 718/104

(Continued)

OTHER PUBLICATIONS

Owen and Paul Wallace, "Feature Brief: Stingray's Autoscaling capability" Brocade website, May 1, 2013, accessed on Jul. 1, 2016 at http://community.brocade.com/t5/vADC-Docs/Feature-Brief-Stingray-s-Autoscaling-capability/ta-p/73843.

(Continued)

*Primary Examiner* — Blake J Rubin
(74) *Attorney, Agent, or Firm* — Adeli LLP

(57) ABSTRACT

Autoscaling comprises: accessing operational data associated with a pool of servers; determining an expected load associated with a service provided by the pool of servers based at least in part on the operational data; determining an estimated capacity associated with the service provided by the pool of servers; determining that an autoscale operation is to be performed based at least in part on the expected load and the estimated capacity, wherein the autoscale operation automatically scales out one or more additional servers or automatically scales in one or more servers in the pool of servers; and performing the autoscale operation.

20 Claims, 16 Drawing Sheets

400
AutoScale Trigger
402
Alerts
408
Metrics
Triggers
Events
Analytics
410
Autoscheduler
Manual Scheduler
Intelligent AutoScaler
412
AutoScale Decision
404
AutoScale Policy
406
Openstack Driver
openstack
AWS Driver
AWS
VMWare Driver
vCenter
AutoScale Event
AutoScale Events
-EvSvrScaleOutComplete
-EvSvrScaleInComplete
-EvSvrAutoScaleFailed
AutoScale Alert Actions:
*WebHook
*Python Script

(56) References Cited

U.S. PATENT DOCUMENTS 8,874,725 B1 10/2014 Ganjam et al.
9,032,078 B2* 5/2015 Beerse ........ H04L 47/70 709/226
9,210,056 B1 12/2015 Choudhary et al.
9,288,193 B1* 3/2016 Gryb ........ H04L 63/08
9,459,980 B1* 10/2016 Arguelles ........ G06Q 10/06
9,467,476 B1 10/2016 Shieh et al.
9,483,286 B2 11/2016 Basavaiah
9,531,614 B1 12/2016 Nataraj et al.
9,571,516 B1 2/2017 Curcic et al.
9,608,880 B1 3/2017 Goodall
9,613,120 B1* 4/2017 Kharatishvili ...... G06F 16/2358
9,674,302 B1* 6/2017 Khalid ........ G06F 9/5077
9,680,699 B2 6/2017 Cohen et al.
9,692,811 B1 6/2017 Tajuddin et al.
9,712,410 B1 7/2017 Char et al.
9,716,617 B1 7/2017 Ahuja et al.
9,729,414 B1 8/2017 Oliveira et al.
9,935,829 B1* 4/2018 Miller ........ H04L 41/0816
10,003,550 B1* 6/2018 Babcock ........ H04L 47/823
10,212,041 B1 2/2019 Rastogi et al.
10,313,211 B1 6/2019 Rastogi et al.
2002/0078150 A1 6/2002 Thompson et al.
2002/0198984 A1 12/2002 Goldstein et al.
2002/0198985 A1 12/2002 Fraenkel et al.
2003/0191837 A1 10/2003 Chen
2003/0236877 A1 12/2003 Allan
2004/0064552 A1 4/2004 Chong et al.
2004/0103186 A1 5/2004 Casati et al.
2005/0010578 A1 1/2005 Doshi
2005/0060574 A1 3/2005 Klotz et al.
2005/0108444 A1 5/2005 Flauaus et al.
2005/0120160 A1* 6/2005 Plouffe ........ G06F 9/45537 711/1
2005/0172018 A1 8/2005 Devine et al.
2005/0188221 A1 8/2005 Motsinger et al.
2006/0167939 A1 7/2006 Seidman et al.
2006/0242282 A1 10/2006 Mullarkey
2006/0271677 A1 11/2006 Mercier
2008/0104230 A1 5/2008 Nasuto et al.
2008/0126534 A1 5/2008 Mueller et al.
2011/0126111 A1 5/2011 Gill et al.
2011/0196890 A1 8/2011 Pfeifle et al.
2012/0101800 A1 4/2012 Miao et al.
2012/0110185 A1 5/2012 Ganesan et al.
2012/0254443 A1* 10/2012 Ueda ........ H04L 67/1008 709/226
2013/0013953 A1 1/2013 Eck et al.
2013/0086230 A1 4/2013 Guerra et al.
2013/0086273 A1* 4/2013 Wray ........ G06F 9/5072 709/226
2013/0179289 A1* 7/2013 Calder ........ G06Q 30/08 705/26.3
2013/0179881 A1* 7/2013 Calder ........ G06F 9/5072 718/1
2013/0179894 A1* 7/2013 Calder ........ G06F 9/5027 718/104
2013/0179895 A1* 7/2013 Calder ........ G06F 9/5077 718/104
2013/0211559 A1 8/2013 Lawson et al.
2013/0212257 A1 8/2013 Murase et al.
2014/0173675 A1 6/2014 Ahmed et al.
2014/0215058 A1 7/2014 Vicat-Blanc et al.
2014/0215621 A1* 7/2014 Xaypanya ........ H04L 63/145 726/23
2014/0229706 A1 8/2014 Kuesel et al.
2014/0304414 A1* 10/2014 Yengalasetti ....... H04L 67/1036 709/226
2014/0344439 A1* 11/2014 Kempf ........ G06F 9/5072 709/224
2015/0058265 A1* 2/2015 Padala ........ G06N 99/005 706/12
2015/0074679 A1* 3/2015 Fenoglio ........ G06F 9/505 718/104
2015/0081880 A1 3/2015 Eaton et al.
2015/0199219 A1* 7/2015 Kim ........ H04L 67/14 718/104
2015/0288682 A1 10/2015 Bisroev et al.
2015/0295780 A1 10/2015 Hsiao et al.
2015/0295796 A1 10/2015 Hsiao et al.
2015/0358391 A1 12/2015 Moon et al.
2016/0064277 A1* 3/2016 Park ........ H01L 27/10817 438/386
2016/0094431 A1 3/2016 Hall et al.
2016/0094483 A1* 3/2016 Johnston ........ H04L 47/827 709/226
2016/0105335 A1 4/2016 Choudhary et al.
2016/0127204 A1* 5/2016 Ozaki ........ H04L 43/04 709/224
2016/0164738 A1* 6/2016 Pinski ........ H04L 41/0896 709/224
2016/0182399 A1 6/2016 Zadka et al.
2016/0294722 A1* 10/2016 Bhatia ........ H04L 47/70
2016/0323377 A1* 11/2016 Einkauf ........ H04L 67/1076
2017/0041386 A1 2/2017 Bhat et al.
2017/0063933 A1 3/2017 Shieh et al.
2017/0134481 A1 5/2017 DeCusatis et al.
2017/0331907 A1* 11/2017 Jagannath ........ H04L 67/16
2018/0004582 A1 1/2018 Hallenstål
2018/0018244 A1* 1/2018 Yoshimura ........ G06F 11/2023
2018/0041408 A1 2/2018 Dagum et al.
2018/0046482 A1* 2/2018 Karve ........ G06F 9/45558
2018/0088935 A1 3/2018 Church et al.
2018/0089328 A1 3/2018 Bath et al.
2018/0136931 A1 5/2018 Hendrich et al.
2018/0309637 A1 10/2018 Gill et al.
2019/0123970 A1 4/2019 Rastogi et al.

OTHER PUBLICATIONS

"Auto Scaling" Amazon Web Services website, Aug. 20, 2015 version access on Jul. 1, 2016 at http://web.archive.org/web/20150820193921/https://aws.amazon.com/autoscaling/.

"Autoscaling Groups of Instances" Google Cloud Platform website, Aug. 3, 2015 version access on Jul. 1, 2016 at http://web.archive.org/web/20150803103035/https://cloud.google.com/compute/docs/autoscaler/.

Andy De George "How to Scale an Application" Microsoft Azure website, Sep. 5, 2015 version access on Jul. 1, 2016 at https://web.archive.org/web/20150905222847/https://azure.microsoft.com/en-us/documentation/articles/cloud-services-how-to-scale/.

Yar et al. "Prediction intervals for the Holt-Winters forecasting procedure." International Journal of Forecasting 6.1 (1990): 127-137.

Catania, V., et al., "PMT: A Tool to Monitor Performances in Distributed Systems," Proceedings of the 3rd IEEE International Symposium on High Performance Distributed Computing, Aug. 2-5, 1994, 8 pages, San Francisco, CA, USA.

Davis, David, "Post #8—Understanding vCenter Operations Badges," David Davis Blog, Apr. 29, 2014, 5 pages, retrieved from http://blogs.vmware.com/management/2014/04/david-davis-on-vcenter-operations-post-8-understanding-vcenter-operations-badges.html.

Liu, Feng, et al., "Monitoring of Grid Performance Based-on Agent," 2007 2nd International Conference on Pervasive Computing and Applications, Jul. 26-27, 2007, 6 pages, IEEE, Birmingham, UK.

Sevcik, Peter, et al., "Apdex Alliance," May 24, 2014, 5 pages, www.apdex.org.

Zhang, Xuehai, et al., "A Performance Study of Monitoring and Information Services for Distributed Systems," Proceedings of the 12th IEEE International Symposium on High Performance Distributed Computing, Jun. 22-24, 2003, 12 pages, IEEE Computer Society, Washington, D.C., USA.

* cited by examiner

INTELLIGENT AUTOSCALE OF SERVICES

CROSS REFERENCE TO OTHER APPLICATIONS

This application claims priority to U.S. Provisional Patent Application No. 62/209,729 entitled ANALYTICS DRIVEN INTELLIGENT AUTOSCALE OF SERVICES filed Aug. 25, 2015 which is incorporated herein by reference for all purposes.

BACKGROUND OF THE INVENTION

A key requirement of modern software-defined networking (SDN) is the ability to scale system resources on-demand. Applications in a data center should be scaled out (e.g., new instances of applications are added) as load reaches operating capacity, and scaled in (e.g., instances of applications in execution are removed or terminated) when there is not enough load. Generally speaking, automatic scaling of resources (also referred to as autoscaling) involves using the optimal number of resources to handle the load while meeting the Service Level Agreements (SLAs). Traditional autoscaling techniques typically measure server capacity and scale out application instances when a server reaches capacity. The capacity is typically measured in terms of resources like central processing unit (CPU) usage, memory usage, or response time. The system administrator can specify certain autoscaling policies, e.g., response time must be less than 500 ms (the policy limit), and application instances are scaled out if the response time exceeds the policy limit. However, it is quite possible that saturation may have happened even though the response time has not yet increased to 500 ms. The system may experience errors before the response time increases beyond 500 ms. In a different scenario, server response time may have been linearly increasing to 600 ms without being flagged on the saturation curve. At some point, the SLA would drop unless the number of servers is increased, as any new requests may be dropped or improperly serviced due to errors. Thus, existing autoscaling techniques have certain limitations, such as inaccurate metrics, lack of dynamic scaling during operation, overly optimistic assessment of servers even as they reach saturation, and lag time in load conditions, etc. A more accurate autoscaling technique that can take into account load conditions dynamically is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic scaling of servers is disclosed. In embodiments described herein, an expected load and an estimated capacity associated with a service provided by a pool of servers are determined. A determination is made that an autoscale operation is to be performed based at least in part on the expected load and the estimated capacity. The autoscale operation is performed to scale in or scale out one or more servers. As used herein, scaling out refers to adding resources to an existing resource pool, such as adding or activating a new server to a pool of servers, and scaling in refers to decreasing resources in an existing resource pool, such as removing or deactivating a server from the pool of servers.

Figure 1:
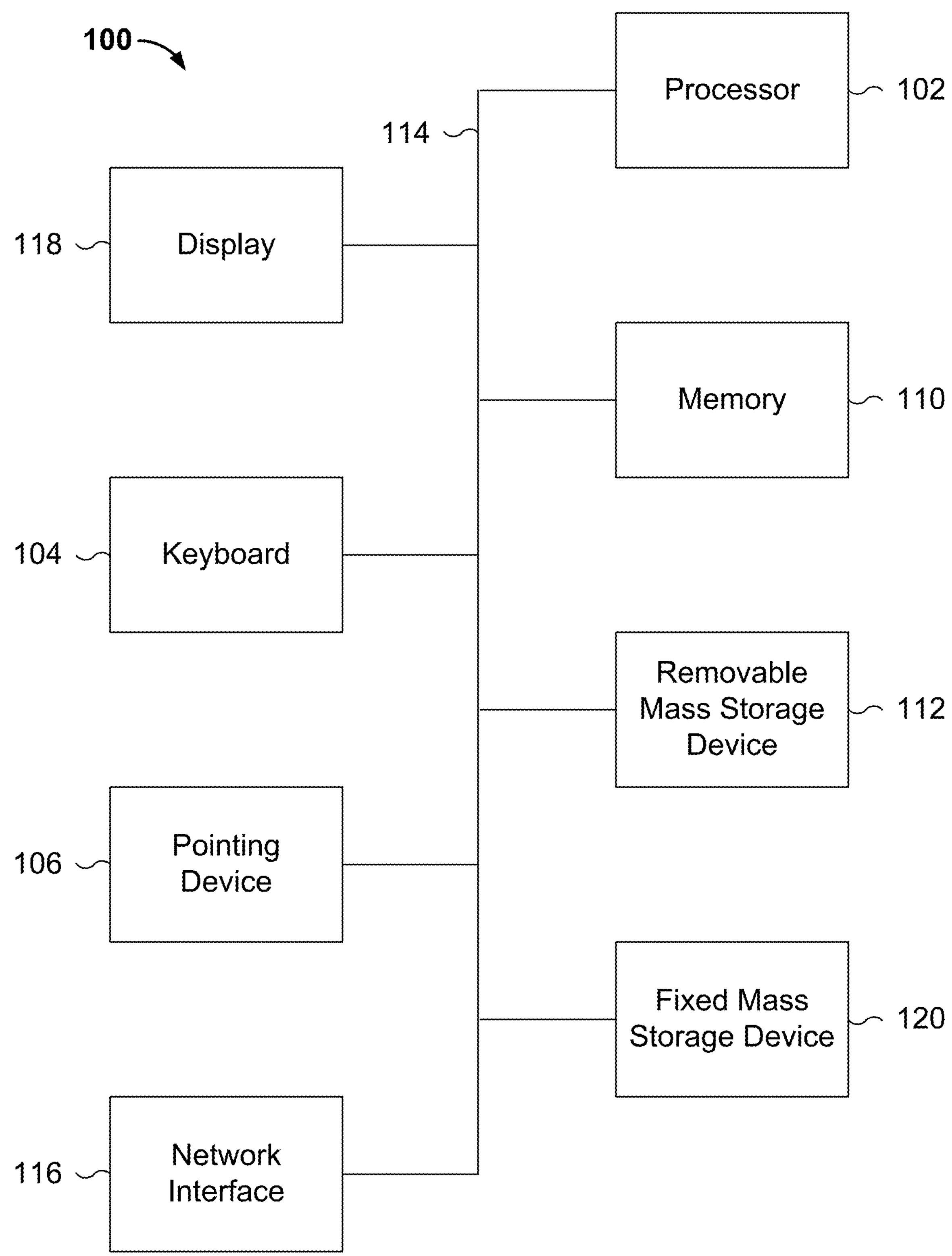
FIG. 1 is a functional diagram illustrating a programmed computer system for making intelligent autoscaling decisions in accordance with some embodiments.

FIG. 1 is a functional diagram illustrating a programmed computer system for making intelligent autoscaling decisions in accordance with some embodiments. As will be apparent, other computer system architectures and configurations can be used to perform intelligent autoscaling. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide an autoscale manager described below in connection with FIG. 3A.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

An optional removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storages 112, 120 generally store additional programming instructions, data, and the like that typically are not in active use by the processor 102. It will be appreciated that the information retained within mass storages 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An optional auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer-readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
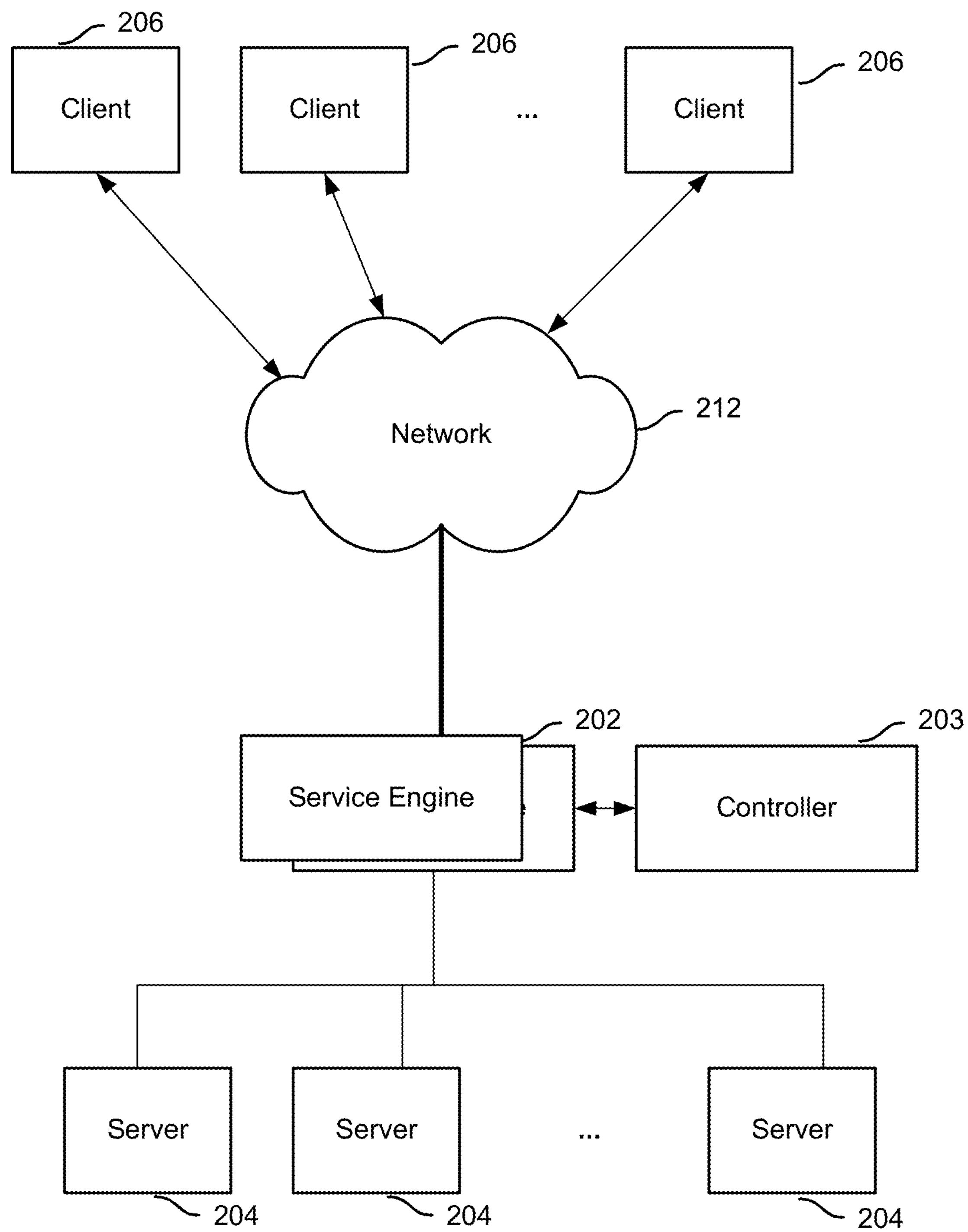
FIG. 2 is a block diagram illustrating an embodiment of a system that includes an intelligent autoscale manager.

FIG. 2 is a block diagram illustrating an embodiment of a system that includes an intelligent autoscale manager.

Clients 206 are configured to access services provided by servers 204 via a network 212. One or more services are provided by a pool of servers 204. One or more service engines 202 are configured to intercept traffic and provide various network services such as load balancing, firewall, etc. In this example, the service engines can be implemented as networking devices such as load balancers, firewalls, etc.

A controller 203, which includes an intelligent autoscale manager, is configured to perform various management functions such as monitoring system metrics and/or events, performing analytics on detected metrics and/or events, making autoscale decisions, invoking operations to disable servers during scale-in or enable servers during scale-out, etc.

Examples of a client of clients 206 include a laptop computer, a desktop computer, a smartphone, a tablet computer, a wearable computer, or any other networked device. Controller 202 may include one or more devices and/or servers. Each server of servers 204 may include a plurality of physical devices and/or processors. Examples of network 212 include one or more of the following: a direct or indirect physical communication connection, a mobile communication network, a wireless network, the Internet, an intranet, a Local Area Network, a Wide Area Network, a Storage Area Network, a hybrid network, and any other form of communication connecting two or more systems, components, or storage devices together. Other communication paths may exist and the example shown has been simplified to illustrate the example clearly. The connections between the components shown in FIG. 2 may be a wired connection, a wireless connection, and/or software data communication paths. Although limited instances of components are shown in the example to simplify the diagram, additional instances of any of the components shown in FIG. 2 may exist. Components not shown in FIG. 2 may also be included. For example, networking components such as switches, routers, gateways, management devices, etc. have not been shown to simplify and illustrate the embodiment more clearly.

Figure 3A:
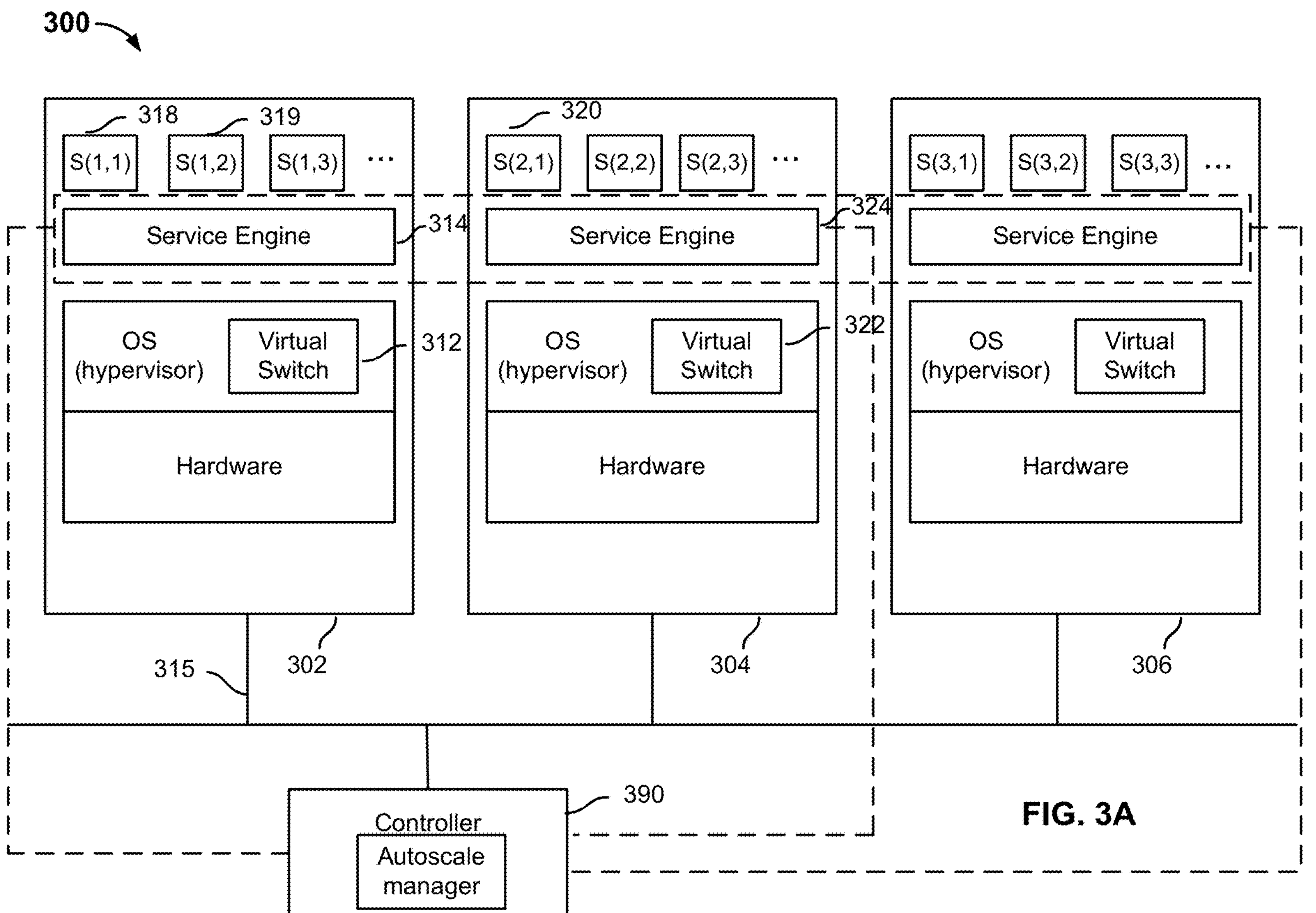
FIG. 3A is a block diagram illustrating another embodiment of a system that includes an intelligent autoscale manager.

FIG. 3A is a block diagram illustrating another embodiment of a system that includes an intelligent autoscale manager.

In this example, platform 300 includes a number of devices (e.g., multiple server computers or a multicore server comprising multiple processing cores). A physical device (e.g., 302, 304, 306, etc.) has hardware components and software components, and may be implemented using a device such as system 100. Separate physical devices communicate with each other via communication interfaces such as ports, wireline or wireless network interface cards, etc. Although three systems are shown for purposes of illustration, the number of systems and the number of components within each system can vary in other embodiments.

In some embodiments, the devices include virtual machine (VM)-based systems. In a VM-based system, a number of virtual machines (VMs) such as 318, 319, etc. are configured to execute on the same device such as 302. A VM is a software implementation of a machine (e.g., a computer) that simulates the way a physical machine executes programs. Each VM executes its own operating system. Within the operating system, applications and/or services (collectively referred to as services hereinafter) are configured to execute as they would on a standard non-VM-based system. The part of the device's operation system that manages the VMs is referred to as the hypervisor. The hypervisor interfaces between the physical hardware and the VMs, providing a layer of abstraction for the VMs. Through its management of the VMs' sharing of the physical hardware resources, the hypervisor makes it appear as though each VM were running on its own dedicated hardware. Examples of hypervisors include VMware Workstation® and Oracle VM VirtualBox®.

In some embodiments, the devices include container-based systems. In a container-based system, multiple containers such as 318, 319, etc. are configured to execute on the same device such as 302, within the same operating system. Each container functions as a lightweight VM that can execute other programs. Examples of container-based systems include Kubernetes, Docker, Mesos, etc.

In some embodiments, the devices include a combination of VM-based systems, container-based systems, and/or standard systems (e.g., non-VM-based systems and/or non-container-based systems).

In this example, clients (not shown) communicate with servers, which are configured to execute within VMs or containers to provide services (also referred to as target applications). Examples of such services include a website service, a shopping cart application, user authentication, credit card authentication, email service, file sharing service, virtual desktop, voice/video streaming, online collaboration, etc. Many other services can be implemented. A server (e.g., a web server, a credit card processing server, a database server, etc.) executes within a VM or container to provide a service, and multiple servers can execute on multiple VMs to provide the same service. For example, three separate servers execute within VMs or containers 318, 320, and 330 to provide the $1^{st}$ service; three separate servers execute within VMs or containers 319, 329, and 339 to provide the $2^{nd}$ service; etc.

In the example shown, inside the operating system, there are multiple modules providing different functionalities. One of the modules is a virtual switch (312, 322, etc.). A physical device hardware has one or more physical ports (e.g., Ethernet ports). Network traffic (e.g., data packets) can be transmitted or received by any of the physical ports, to or from any VMs or containers. The virtual switch is configured to direct traffic to and from one or more appropriate VMs or containers, such as the VM or container in which the service engine on the device is operating.

Service engines 314, 324, and 334 (also referred to as SE1, SE2, and SE3, respectively) are instantiated on physical devices 302, 304, and 306, respectively. In some embodiments, a service engine is implemented as software executing in a virtual machine or container. The service engine is executed to provide distributed network services for processes executing on the same physical server as the service engine as well as for processes executing on different physical servers. As used herein, distributed network services refer to services that pertain to network functions, such as load balancing, authorization, security, content acceleration, analytics, application management, etc. Multiple service engines are configured to cooperate and provide the distributed network services. In some embodiments, the service engine is configured to enable appropriate service components that implement service logic. When a specific service is desired, a corresponding server is configured and invoked by the service engine to execute in a VM. In this example, the servers are denoted as S(i, j), where i represents the service engine identifier and j represents the service identifier. Thus, S(1,1) indicates that the server corresponds to SE1 and the $1^{st}$ service, S(2, 1) indicates that the server corresponds to SE2 and the $1^{st}$ service, etc. The service engine also gathers operational data for the services (e.g., numbers of open connections for the $1^{st}$ service maintained by servers S(1,1), S(2,1), and S(3, 1), respectively; number of requests made to servers S(1,1), S(2,1), and S(3, 1), respectively; etc.). Note that the number of instances of servers providing a particular service can vary; for example, there can be multiple servers providing the $1^{st}$ service on device 322 (in other words, multiple S(2,1)'s can execute in multiple VMs on device 322).

A virtual switch such as 312 interacts with the service engines, and uses existing networking Application Programming Interfaces (APIs) (such as APIs provided by the operating system) to direct traffic and provide distributed network services for services deployed on the network. The operating system and the services implement the networking API calls (e.g., API calls to send data to or receive data from a specific socket at an Internet Protocol (IP) address). In some embodiments, the virtual switch is configured to be in-line with one or more VMs or containers and intercepts traffic designated to and from instances of the services executing on the VMs or containers. When a networking API call is invoked, traffic is intercepted by the in-line virtual switch, which directs the traffic to or from the appropriate VM on which instances of the service executes. In some embodiments, a service engine sends data to and receives data from a server via the virtual switch.

Traffic received on a physical port of a server (e.g., a communications interface such as Ethernet port 315) is sent to the virtual switch (e.g., 312). In some embodiments, the virtual switch is configured to use an API provided by the hypervisor to intercept incoming traffic designated for the target application(s) in an in-line mode, and send the traffic to an appropriate service engine. In in-line mode, packets are forwarded on without being replicated. As shown, the virtual switch passes the traffic to a service engine in the distributed network service layer (e.g., the service engine on the same physical device), which transforms the packets if needed and redirects the packets to the appropriate target application. The service engines cooperate to provide distributed network services such as load balancing, security, etc. For example, when a request for the 1$^{st}$ service is received on interface 315, 325, or 335, the request is forwarded by virtual switch 312, 322, or 332 to service engines 314 (SE1), 324 (SE2), or 334 (SE3), respectively. Each service engine determines, based on current load balancing conditions (e.g., number of open connections handled by each server) and preconfigured load balancing rules (e.g., the number of open connections handled by each server should be approximately the same), whether the request should be serviced by server S(1,1), S(2,1), or S(3,1). In other words, each service engine can distribute the request across physical device boundaries (via the virtual switch and the physical interface such as the networking interface) to any server providing the desired service. The service engines further gather operational data associated with each server, such as current number of open connections for a service associated with each server, average number of requests/second, average connections/second, maximum number of open connections over a period of time, latency, average response time, etc. Many other types of operational data can be collected. Details of how the virtual switch and the service engine interact to handle traffic and collect operational data are described below in FIG. 3B. As will be described in greater detail below, the autoscale manager obtains the operational data from the service engines, determines an expected load and an estimated capacity, and makes decisions regarding whether to scale in or out based on the expected load and the estimated capacity.

A controller 390 is configured to control, monitor, program, and/or provision the services, virtual machines, and/or containers. In particular, the controller is configured to control, monitor, program, and/or provision a group of service engines, and is configured to perform functions such as bringing up the service engines, downloading software onto the service engines, sending configuration information to the service engines, monitoring the service engines' operations, detecting and handling failures, and/or collecting analytics information. The controller can be implemented as software, hardware, firmware, or any combination thereof. In this example, controller 390 includes an autoscale manager configured to scale in or out servers based on an expected load and an estimated capacity.

Figure 3B:
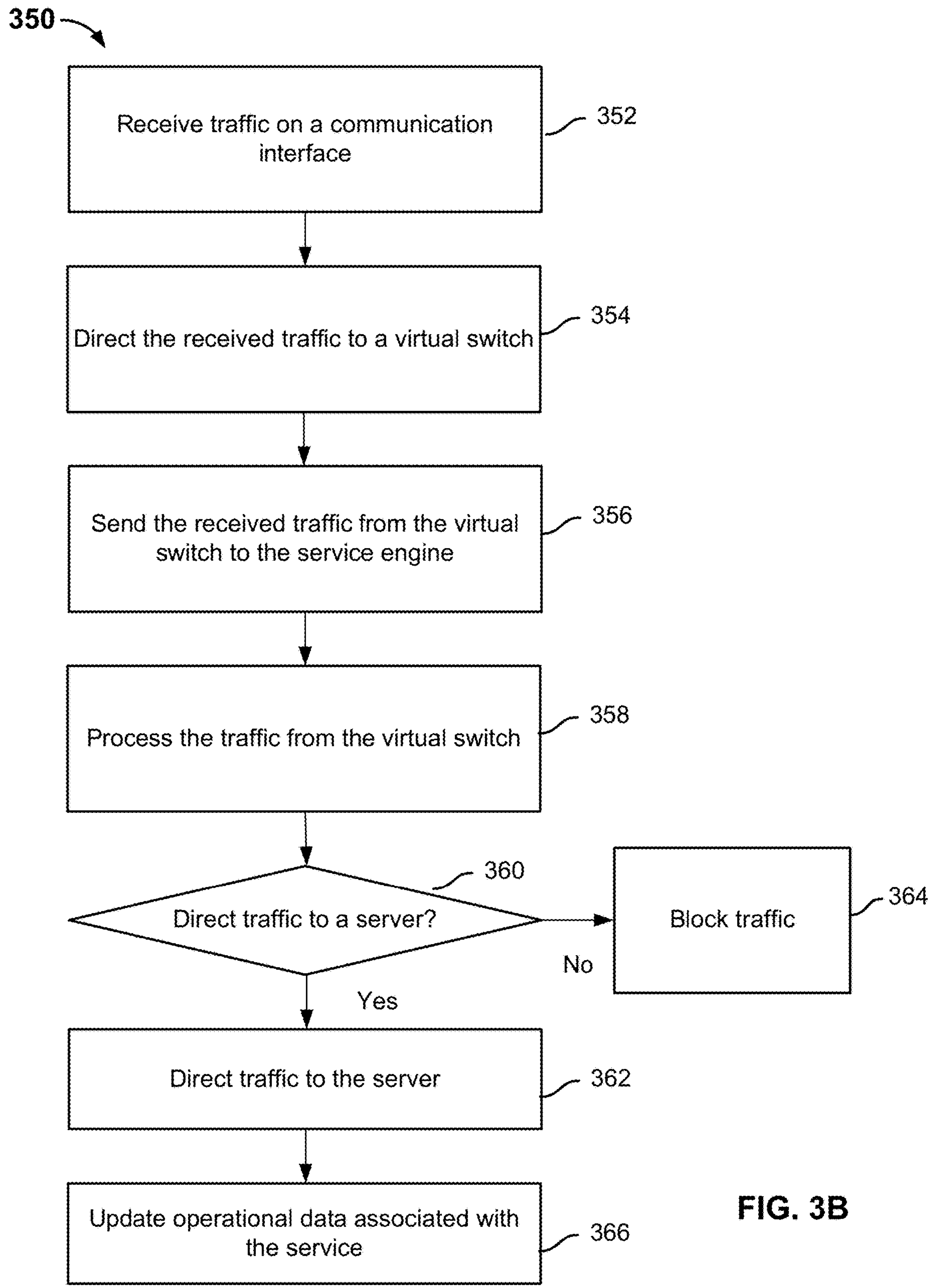
FIG. 3B is a flowchart illustrating an embodiment of a process for handling incoming traffic and collecting operational data.

FIG. 3B is a flowchart illustrating an embodiment of a process for handling incoming traffic and collecting operational data. Process 350 may be performed by a device such as 302, and specifically by components such as virtual switch 312 and the service engine 314.

At 352, traffic (e.g., packets) is received on a communication interface (e.g., a physical port) on the device.

At 354, the received traffic is directed to the virtual switch on the device. In this example, the virtual switch is configured to operate in an in-line mode to intercept the traffic. In in-line mode, packets are forwarded on without being replicated.

At 356, the received traffic is sent from the virtual switch to the service engine. Referring to the example shown in FIG. 3A, packets received by communication interface 315 of device 302 and designated for one or more target applications on the device are forwarded to virtual switch 312, which redirects the received traffic to service engine 314.

Returning to FIG. 3B, at 358, appropriate processing is applied to the traffic redirected from the virtual switch by the service engine. The service engine can be configured to perform various processing on the traffic. For example, where the service engine is configured to perform load balancing, it processes the packet and applies load balancing processing by determining which target application the packet should be sent; where the service engine is configured to perform security functions such as firewall, it applies security functions and determines whether the packet should be forwarded or dropped; where the service engine is configured to perform compression or decompression, the service engine compresses (or decompresses) incoming data. In some embodiments, multiple types of processing can be configured and the processing can be sequential or in parallel. In some embodiments, the processing logic is performed in a certain order. For example, firewall processing is performed first. If the packet is dropped, no further processing is needed; if the packet is forwarded, load balancing or other processing may be performed subsequently.

At 360, it is determined whether the traffic is to be directed to a selected server, as a result of step 358. The determination is optional and may be omitted in some embodiments. In the event that the traffic is determined to be directed to a selected server, the traffic is so directed at 362. Otherwise, no action is required and the traffic is blocked at 364. In some embodiments, log information is optionally recorded.

At 366, operational data associated with the service is updated in the service engine. The operational data can include number of open connections, number of requests, latency, or any other appropriate data associated with the traffic and/or its processing. The operational data can be maintained as tables, logs, or other appropriate data format. For example, the number of connections associated with the service provided by the server can be incremented, the latency can be updated, etc. In the example of FIG. 3A, service engines 314, 324, etc. each maintain operational data associated with the service for the pool of servers.

Figure 4:
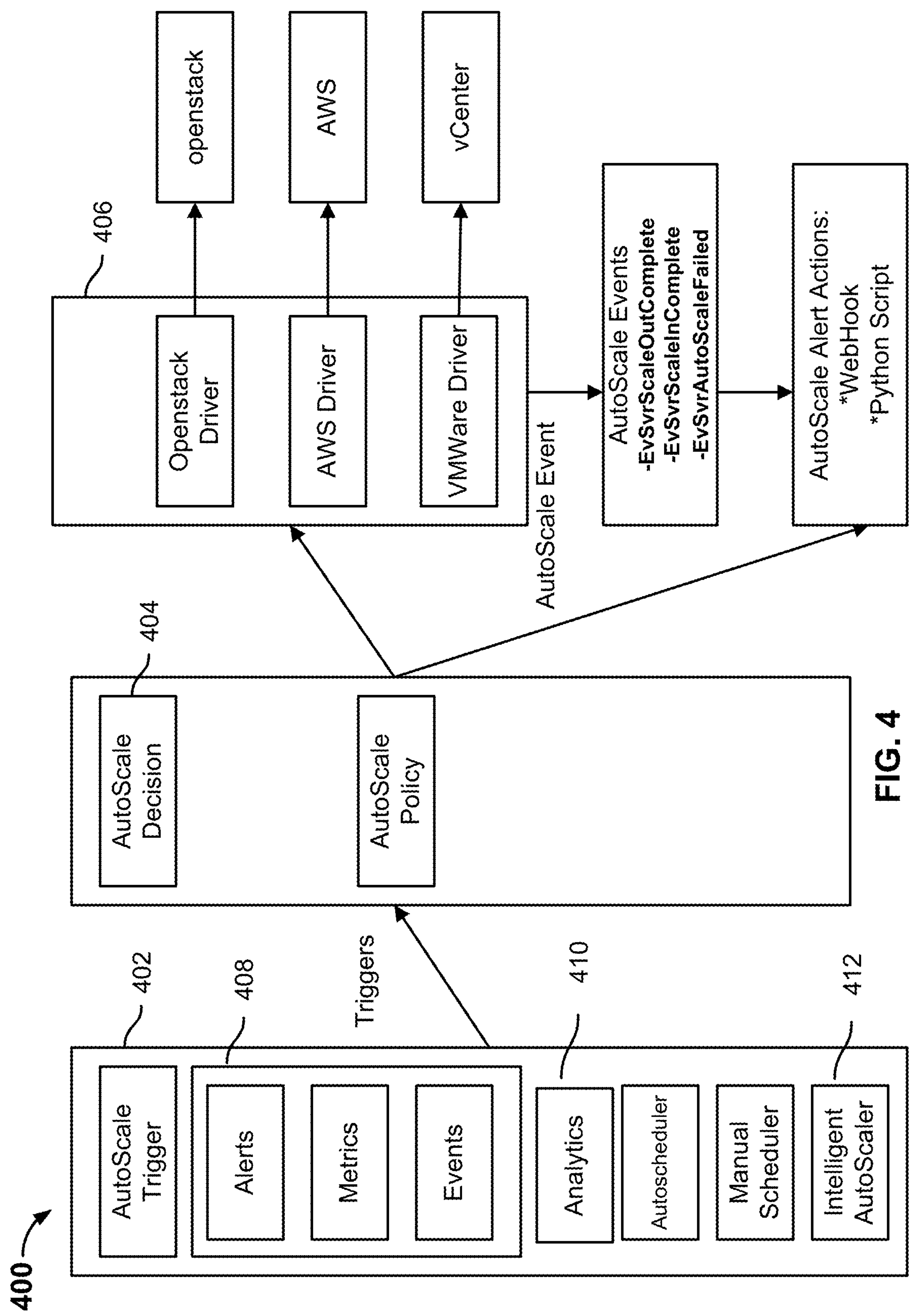
FIG. 4 is a block diagram illustrating an embodiment of an intelligent autoscale manager.

FIG. 4 is a block diagram illustrating an embodiment of an intelligent autoscale manager. In this example, autoscale manager 400 performs autoscaling with respect to a pool of servers. Autoscale manager 400 includes an autoscale trigger engine 402, an autoscale decision engine 404, and an autoscale orchestration engine 406.

In the example shown, autoscale trigger 402 is configured to generate triggers that indicate whether additional servers are to be scaled out (added) or some existing servers are to be scaled in (removed). Specifically, autoscale trigger 402 includes an alert generator 408 which obtains operational data (including metrics, events, etc.) associated with the servers by polling the servers and/or listening for messages sent by the servers. Autoscale trigger engine 402 further includes an analytics component 410 and an intelligent autoscaler 412. The analytics component analyzes the metrics and events received by the alert component and sends results to intelligent autoscaler 412 to be further processed. Based on data received from alert component 408 and/or analytics component 410, the intelligent autoscaler predicts an expected load for the pool of servers, determines an estimated capacity, and generates a trigger for scaling out or scaling in servers as needed. Detailed operations of the intelligent autoscaler are described below.

Autoscale trigger 402 optionally includes an automatic scheduler and/or a manual scheduler. The automatic scheduler allows the system to be configured to automatically send triggers (e.g., at 8:00 am, a trigger indicating that the system needs to scale out additional servers is automatically sent). The manual scheduler allows a user such as a system administrator to manually configure triggers (e.g., the user determines that the system needs to be scaled out and manually sets a trigger via a user interface).

Autoscale decision engine 404 is configured to receive the triggers and maintain an autoscale policy. Based on an autoscale policy and optionally the current status, the autoscale decision engine determines whether an autoscaling operation should be performed. For example, the autoscale policy may specify that a service is allocated a maximum of ten active servers at a time. If a trigger for scaling out is received and there are already ten servers running, then the scaling out operation cannot be performed since no more servers can be added. On the other hand, if there are only nine active servers, then the scaling out operation can be carried out and the autoscale decision engine will cause a new active server to be added. As another example, the autoscale policy may specify that a service must be allocated a minimum of five active servers at a time. If a trigger for scaling in is received and there are five servers running, then the scaling in operation cannot be performed.

In some embodiments, the autoscale decision engine will invoke a script (e.g., a WebHook or Python script) to launch a new instance of a server or terminate an existing instance of a server; in some embodiments, the autoscale decision engine will send a message or the like to an autoscale orchestration component 406 to invoke a system or infrastructure call to initiate a new active server or terminate an existing server. For example, for system implementations based on OpenStack®, Amazon® Web Services (AWS), or VMware®, one or more corresponding application programming interface (API) calls are invoked to initiate a server in OpenStack®, AWS, vCenter® environments, respectively. When the autoscale orchestration component completes its handling of a trigger, an event is optionally generated to indicate whether the scaling operation is successfully completed. In some embodiments, the autoscale decision engine will perform a user-configured behavior such as sending an alert or the like.

In an example system such as 300 of FIG. 3A, a server corresponds to a server launched in a virtual machine. In other embodiments, depending on system implementation, a server can correspond to a container-based server, a standard physical device-based server, etc.

The engines and components described above can be implemented as software code executing on one or more processors, as hardware elements such as programmable logic devices (e.g., microprocessors, field-programmable gate arrays (FPGAs), digital signal processors (DSPs), etc.), Application Specific Integrated Circuits (ASICs) designed to perform certain functions, or a combination thereof. In some embodiments, the engines and components can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The engines and components may be implemented on a single device or distributed across multiple devices. The functions of the engines and components may be merged into one another or further split into multiple sub-components.

Figure 5:
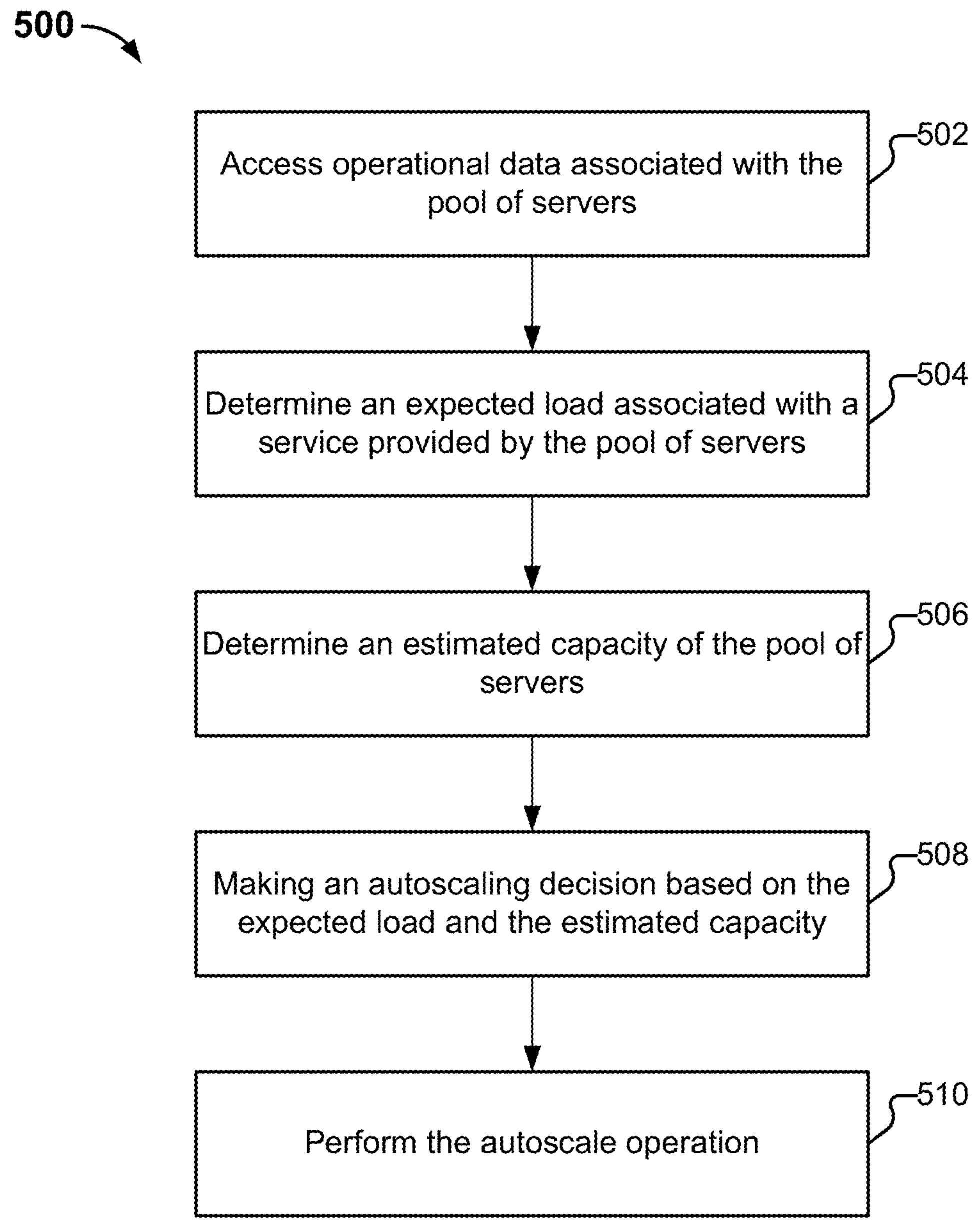
FIG. 5 is a flowchart illustrating an embodiment of a process for automatically scaling a pool of servers.

FIG. 5 is a flowchart illustrating an embodiment of a process for automatically scaling a pool of servers. Process 500 can be performed on a system such as 100, 300, and specifically by an autoscale manager 400. It is assumed that a plurality of servers (e.g., servers 318, 319, 320, etc. of FIG. 3A) is preconfigured to be a pool of servers managed for autoscaling purposes.

At 502, operational data associated with the pool of servers is accessed. The operational data can include performance metrics obtained from the pool of servers, events generated by the pool of servers, or any other appropriate data. Examples of performance metrics include maximum number of open connections, average number of requests per second, average number of connections per second, maximum number of open connections over a specified period of time, current number of connections, latency, average response time, etc. Examples of events include server going online, server going offline, server experiencing error, etc. The operational data can be, for example, obtained by an alert component such as 408 of FIG. 4 by polling the servers and/or receiving messages from the servers. In some embodiments, the alert component also performs certain processing on the operational data, such as reformatting the data. The alert component provides the operational data (e.g., raw received data and/or processed data) to the autoscale manager.

At 504, an expected load associated with a service provided by the pool of servers is determined based on the operational data.

Load associated with a service provided by a server can be measured in terms of number of open connections, number of requests/second, number of connections/second, bandwidth (bits/second), or any other appropriate metrics for the service. Load for the service provided by the pool of servers can be an aggregation (sum) of the load across all the servers. Certain metrics that are available from the service engine, such as l4_server.avg_open_conns (measuring the average number of open connections on a server) or l4_server.avg_complete_requests (measuring the average number of completed requests on a server) can be used to compute the load.

The metrics received from the service engines indicate current load values; however, they are not necessarily suitable for representing a future expected load. This is because in many cases, server loads can vary depending on time of the day, day of the week, etc. (a behavior also referred to as "seasonal"). Thus, using an expected load rather than the current load when making an autoscaling decision will likely result in a more accurate decision, since the system will have more time to provision additional capacity before receiving actual additional load and thus avoiding negative impact to the SLAs. For example, assume that a business website receives most traffic during the hours of 8 AM to 5 PM. Making an autoscale decision at 8 AM based on current data obtained at 8 AM means that the system may not have sufficient capacity to handle the sudden increase in load. Making an autoscale decision well before 8 AM based on the expected load at 8 AM will give the system extra time to scale out additional servers before the load actually increases at 8 AM. As another example, the load may significantly increase during a promotional event, and an autoscale decision can be made accordingly in anticipation of the event.

In this example, the expected load is an expected maximum load for the pool of servers, represented as $\widehat{E(L_p)}$. The value of $\widehat{E(L_p)}$ is chosen as the greater of a predicted load and the current load. The predicted load is preferably computed as an aggregate of predicted loads of servers in the pool of servers based on historical data over a period of time T rather than a predicted load for an individual server. This is because an individual server can be online or offline at unpredictable times, making the computed load for an individual server a less accurate reflection of the predicted load than an aggregate value. The value for T can be chosen by the administrator based on how much influence past data should have on the measurement (e.g., a T of thirty seconds means past data has less influence on the measurement than a T of ten minutes). A number of techniques for determining the predicted load can be used. Some examples of the techniques such as exponential historical moving average and Holt-Winters forecasting are described in greater detail below. The value of T can be chosen based on the amount of lag time required for the backend server to be instantiated and become only or ready to accept service requests. For example, if the underlying server/cloud infrastructure requires five minutes of setup time, then T should be chosen to be at least five minutes.

At 506, an estimated capacity of the pool of servers is determined.

Capacity associated with a service provided by a server can be measured in terms of number of open connections, average number of requests/second (e.g., number of hypertext transfer protocol (HTTP) requests/second), average number of connections/second, bandwidth (bits/second), etc. Other appropriate metrics can be used. In various embodiments, the measurement for the estimated capacity and the measurement for load can be based on the same metrics or different metrics. In various embodiments, to determine the estimated capacity of a service provided by a server, a number of factors can be used, such as latency, connection quality, errors, service level agreement (SLA), etc. Specifically, threshold values for one or more factors or rates of change for one or more factors can be used to determine the estimated capacity. A number of techniques for determining the server capacity can be used. Some examples of the techniques are described in greater detail below.

For an example system such as 300 of FIG. 3A, for a specific service, the estimated capacity is estimated for all servers in the pool of servers configured to provide the service, across all service engines connected to the pool of servers. In one example, for the $j^{th}$ service, the estimated capacity associated with the $i^{th}$ server is represented as $C_{i,j}$, and the estimated capacity for the pool of servers is represented as $$\sum_{i=1}^{N} C_{i,j},$$

where N corresponds to the number of currently operating servers in the pool. In this example, $C_i$ is measured based on a metric reported by the service engine.

Referring to FIG. 3A for a numerical example, suppose that Table 1 lists the number of open connections maintained by service engines (SE1, SE2, and SE3) for corresponding servers providing the $1^{st}$ service, S(1, 1), S(2, 1), and S(3, 1).

TABLE 1

| | S(1, 1) | S(2, 1) | S(3, 1) |
|---|---|---|---|
| SE1 | 200 | 150 | 200 |
| SE2 | 100 | 250 | 300 |
| SE3 | 0 | 100 | 400 |

In one example, $C_{i,j}$ is l4_server.max_capacity, which measures the maximum number of open connections for the $i^{th}$ server across all service engines, and is expressed as $$C_{i,j}=\max(C_{i,j[se]}) \quad (1)$$

By taking the maximum in each column, the estimated capacities for the servers are $C_{1,1}=200$, $C_{2,1}=250$, and $C_{3,1}=400$; thus, the estimated capacity for the $1^{st}$ service is 200+250+400=850 maximum open connections.

In another example, $C_{i,j}$ is l4_server.average_capacity, which measures the average number of open connections for the $i^{th}$ server across all service engines. The estimated capacities for the servers are $$C_{1,1} = \frac{200+100+0}{3} = 100,\ C_{2,1} = \frac{150+250+100}{3} = 166.67,$$

and $$C_{3,1} = \frac{200+300+400}{3} = 300,$$

and thus the estimated capacity for the $1^{st}$ service is 100+166.67+300=566.67 average number of open connections.

At 508, based on the expected load and the estimated capacity, an autoscaling decision is made to perform an autoscale operation that scales out one or more additional servers or scales in one or more servers in the pool of servers.

In this example, the expected load and the estimated capacity are compared to determine whether the pool of servers would have sufficient capacity to handle the expected load. In particular, if the estimated capacity does not meet the expected load with a margin, as expressed below, then one or more additional servers should be scaled out:

$$\frac{\sum_{i}^{N} C_i}{E(\overline{L_p})} < 1 + \alpha \tag{2}$$

where the excess capacity margin α is within [0, 1], and N is the number of existing servers in the pool.

If the estimated capacity exceeds the expected load with a margin, as expressed below, then one or more existing servers should be scaled in:

$$\frac{\sum_{i}^{N} C_i}{E(\overline{L_p})} < 1 + \beta \tag{3}$$

where the maximum excess capacity margin β is within [0, k], k represents the extra capacity margin, and N is the number of existing servers in the pool. In a typical system, α<β.

In some cases, the number of servers to be scaled out or scaled in is computed. The normalized capacity of a server is denoted as $\hat{C}$, which can be the maximum capacity value of the existing servers, an average or medium capacity value, etc. The number of new servers needed for a scale-out operation, $S_{out}$, is computed according to the following equation:

$$\frac{\sum_{i}^{N} C_i + S_{out}\hat{C}}{E(\overline{L_p})} = 1 + \alpha \tag{4}$$

such that $$S_{out} = \frac{1}{\hat{C}}\left((1+\alpha)E(\overline{L_p}) - \sum_{i}^{N} C_i\right) \tag{5}$$

Similarly, the number of existing servers to be scaled in, $S_{in}$, is computed according to the following equation:

$$\frac{\sum_{i}^{N} C_i - S_{in}\hat{C}}{E(\overline{L_p})} = 1 + \beta \tag{6}$$

such that $$S_{in} = \frac{1}{\hat{C}}\left(\sum_{i}^{N} C_i - (1+\beta)E(\overline{L_p})\right) \tag{7}$$

At 510, the autoscale operation is performed. In various embodiments, the autoscale operation includes invoking a script, executing a system call, an infrastructure call, an API call, etc., to scale servers in or out.

Figure 6:
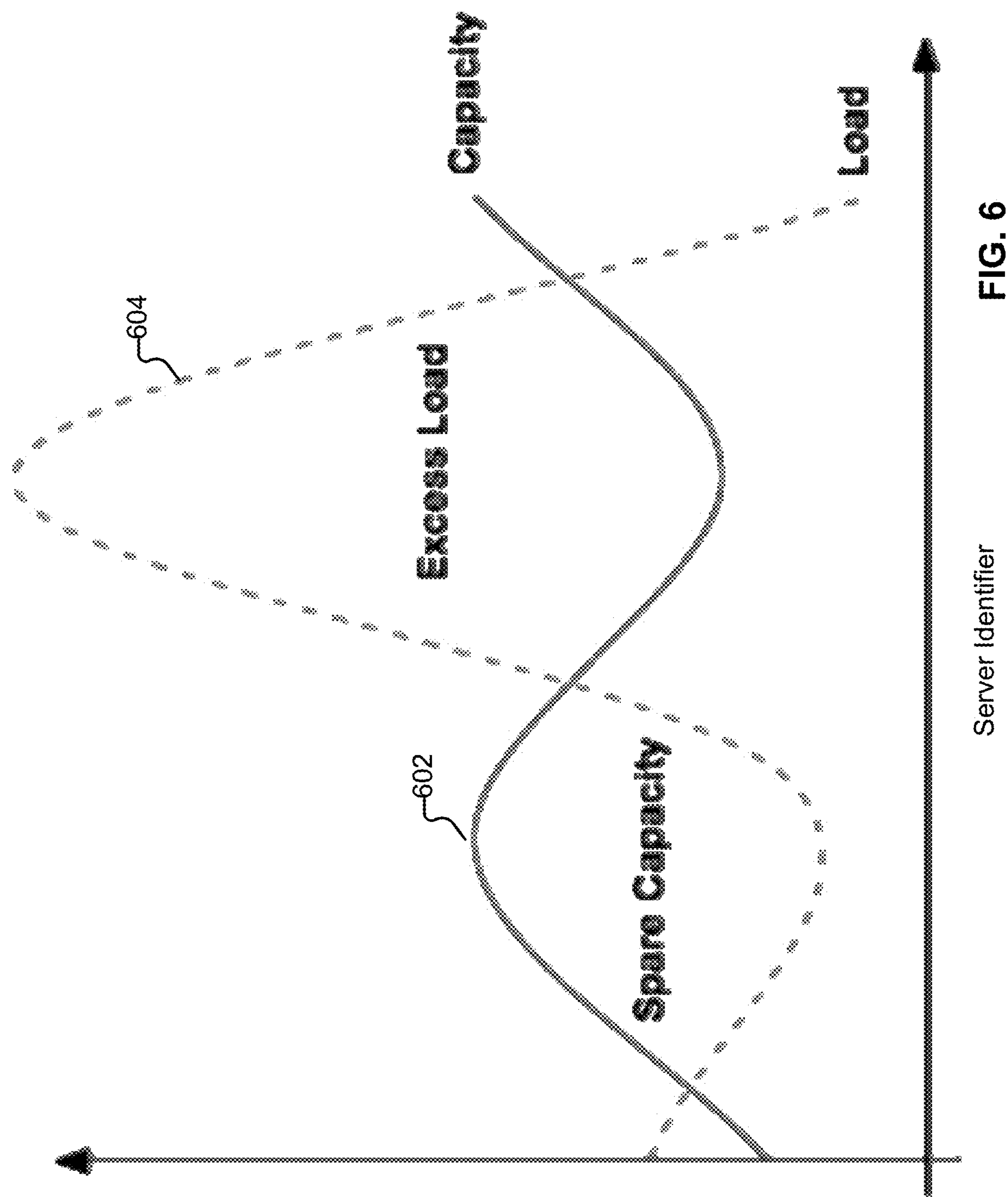
FIG. 6 is a diagram illustrating the relationship between capacity and load.

FIG. 6 is a diagram illustrating the relationship between capacity and load. Line 602 shows the capacity of the system with respect to individual servers, and line 604 illustrates the load with respect to the individual servers. Any positive difference between the capacity and load is spare capacity, and any negative difference between the two is excess load.

A number of techniques can be used to determine the predicted load. A historical moving average technique and a Holt-Winters algorithm-based technique are explained in more detail in connection with FIGS. 7-10.

Figure 7:
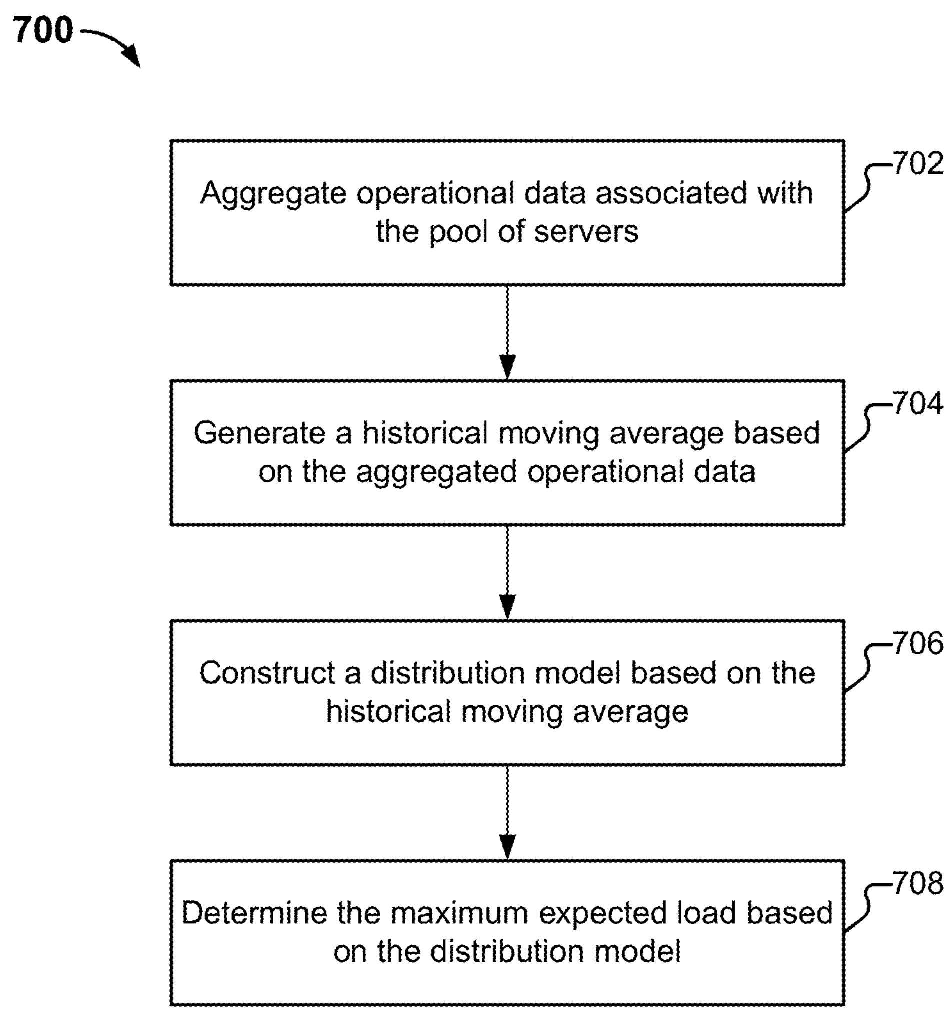
FIG. 7 is a flowchart illustrating an embodiment of a process for determining the expected load based on the historical moving average.

FIG. 7 is a flowchart illustrating an embodiment of a process for determining the expected load based on the historical moving average. Process 700 can be used to implement 504 of process 500.

At 702, operational data associated with the pool of servers, such as the values of a performance metric (e.g., average number of requests per second, average number of connections per second, etc.) of the pool of servers is aggregated. In this example, the aggregation is performed by a metrics manager operating within the controller periodically. The interval (also referred to as granularity) for the aggregation is implementation dependent. In various embodiments, the aggregation can occur every five minutes, every hour, etc. In some embodiments, multiple levels of aggregations can take place. For example, operational data is aggregated every five minutes at a first level, and the aggregated data is aggregated again every hour, etc.

Figure 8:
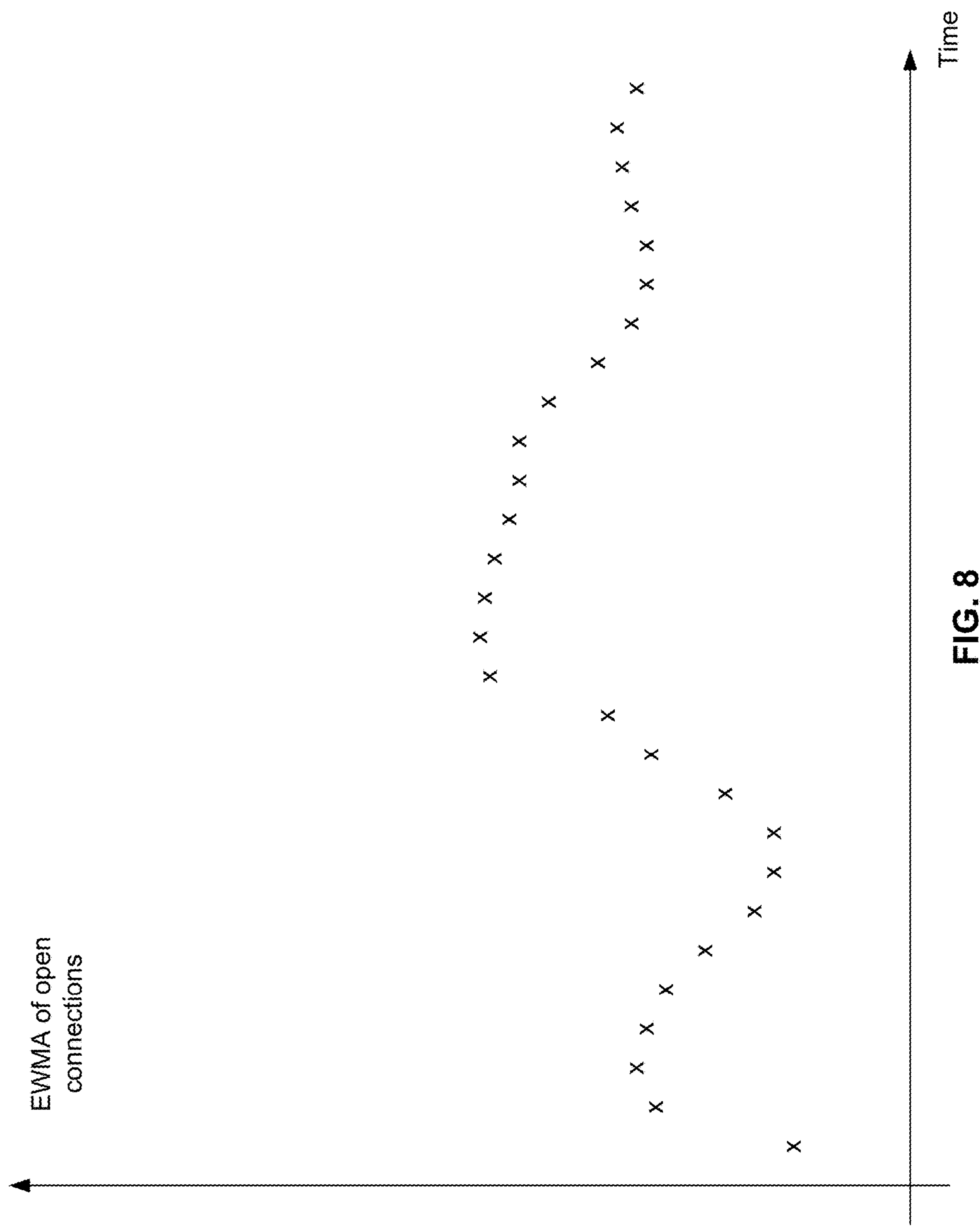
FIG. 8 is a diagram illustrating an example of an exponential moving average of a metric.

At 704, a historical moving average such as an exponential weighted moving average (EWMA) of the aggregated operational data is generated and maintained. The EWMA is a type of moving average that gives more weight to the latest data. The weights assigned to the EWMA are configurable and can be selected depending on how much weight to give to the latest data. FIG. 8 is a diagram illustrating an example of an exponential moving average of a metric. The X axis corresponds to time and the Y axis corresponds to the EWMA value of the metric (or equivalently the load value). Each piece of the aggregated load data is referred to as a sample.

Figure 9:
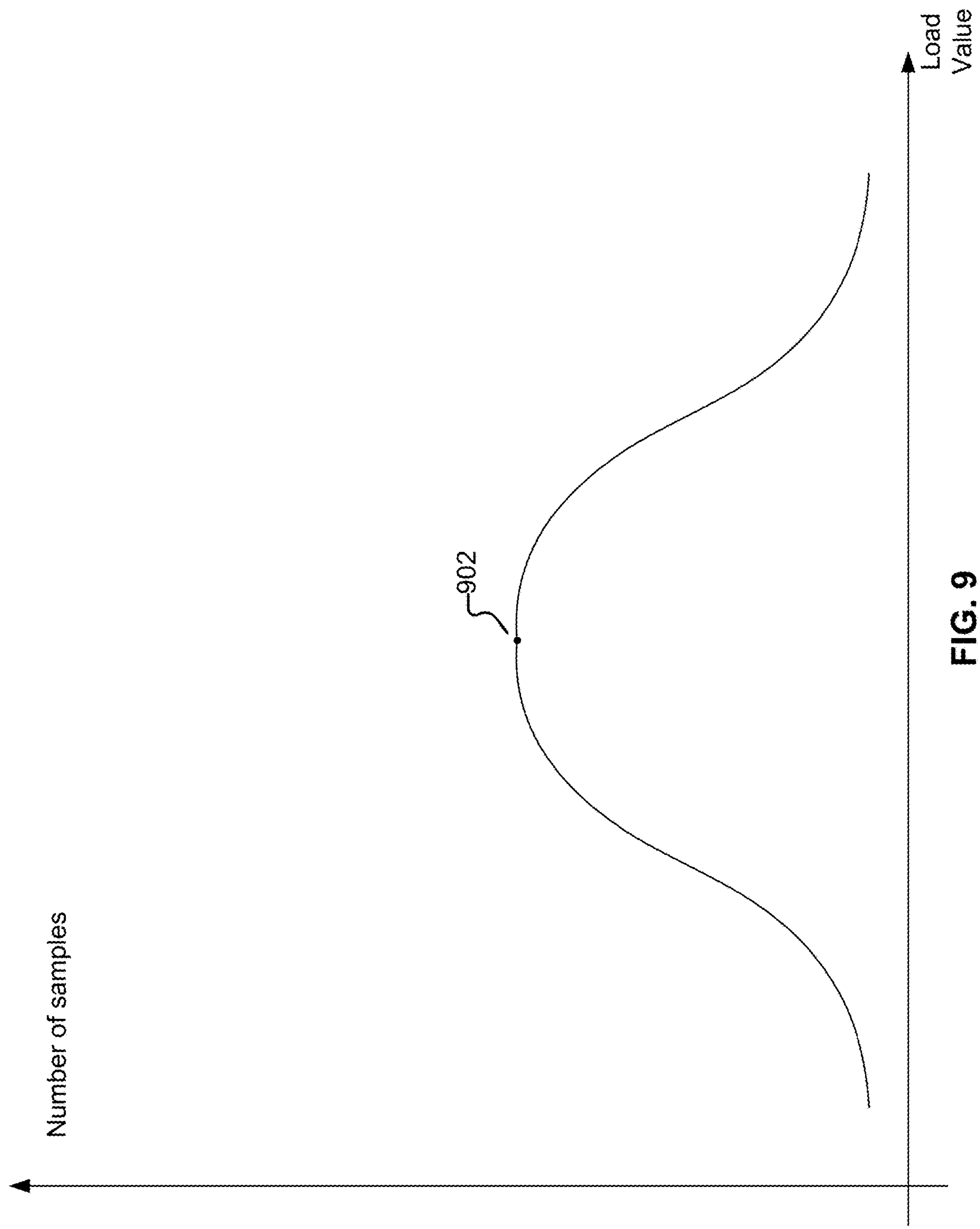
FIG. 9 is a diagram illustrating an example distribution model.

Returning to FIG. 7, at 706, based on the historical moving average, a distribution model of load value versus number of samples is constructed. In this example, the distribution model can be constructed by counting the number of samples that corresponds to various load values. FIG. 9 is a diagram illustrating an example distribution model. In this diagram, the X axis corresponds to load value and the Y axis corresponds to the number of samples.

At 708, the maximum expected load is determined based on the distribution model. Referring to FIG. 9, the maximum expected load corresponds to the value at 902.

In some embodiments, the distribution model is used to determine a prediction interval for the maximum expected load (e.g., a probability of 95% that the maximum expected load would be within one a). If the load is modeled as a uniform distribution for the sake of simplicity, then the resulting EWMA distribution is expressed as:

$$PI_{EWMA}(\hat{L}_p) = \left[\hat{L}_p - Z_{\frac{\alpha}{2}}\overline{\sigma(L_p)}, \hat{L}_p + \hat{Z}_{\frac{\alpha}{2}}\overline{\sigma(L_p)}\right]$$

where $Z_{\alpha/2}$ is the one-tailed value (that is, within 1 α) of a standard normal distribution of the load, and where $Z_{\alpha/2}$=1.96 for a 95% prediction interval and $\hat{L}_p$ is the predicted load of the pool T time intervals ahead. As described above in connection with 504 of process 500, T is a pre-specified value. Currently, the EWMA-based prediction already computes standard deviation.

Figure 10:
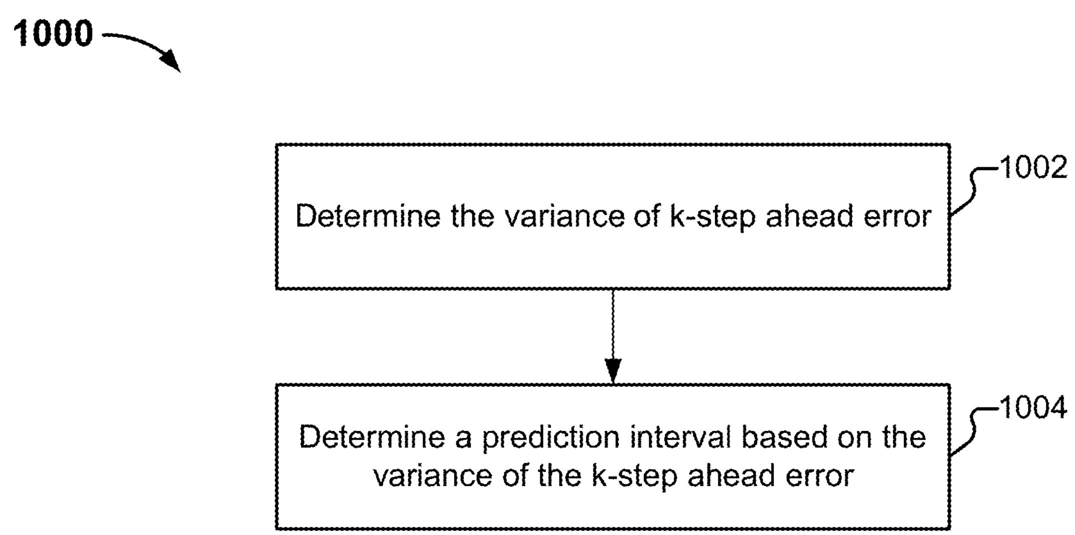
FIG. 10 is a flowchart illustrating an embodiment of a process for determining the expected load based on the Holt-Winters algorithm.

FIG. 10 is a flowchart illustrating an embodiment of a process for determining the expected load based on the Holt-Winters algorithm. Process 1000 can be used to implement 504 of process 500.

At 1002, the variance of the k-step ahead error in estimated value of load, $\mathrm{Var}(e_t(k))$, is determined. The k-step ahead error refers to the estimated statistical error between a predicted value and the actual value k-steps ahead of current time.

How to determine $\mathrm{Var}(e_t(k))$ is known to those skilled in the art. In some embodiments, the k-step ahead error $e_t(k)$ is estimated as a normal distribution, and an exponential moving average is performed to estimate the variance $\mathrm{Var}(e_t(k))$. In some embodiments, $\mathrm{Var}(e_t(k))$ is determined based on the technique described in Prediction Intervals for the Holt-Winters Forecasting Procedure by Mohammed Yar, Chris Chatfield, International Journal of Forecasting, Volume 6, Issue 1, 1990, Pages 127-137.

At 1004, a prediction interval is determined based on the variance of the k-step ahead error as follows:

$$PI_{holt-winters}(\hat{L}_{p[k]}) = \left[\hat{L}_{p[k]} - Z_{\frac{\alpha}{2}}\sqrt{\mathrm{Var}(e_t(k))},\ \hat{L}_{p[k]} + Z_{\frac{\alpha}{2}}\sqrt{\mathrm{Var}(e_t(k))}\right]$$

where $\hat{L}_{p[k]}$ corresponds to k-step prediction of load, and $Z_{\alpha/2}$ corresponds to one tailed distribution value. The maximum expected load is determined based on the prediction interval by taking the greater of the current load and $$\hat{L}_{p[k]} + Z_{\frac{\alpha}{2}}\sqrt{\mathrm{Var}(e_t(k))}.$$

As discussed above, capacity associated with a service provided by a server can be measured in terms of number of open connections, average number of requests/second (e.g., number of HTTP requests/second), average number of connections/second, bandwidth (bits/second), etc. To determine the estimated capacity of a service provided by a server, a number of factors can be used. In the example below, using latency (and/or rate of change in latency) to determine the estimated capacity is discussed extensively for purposes of illustration. Other factors such as SLA constraints, connection quality, errors, rate of change in SLA constraints, rate of change in connection quality, rate of change in errors, etc., can also be used.

Figure 11:
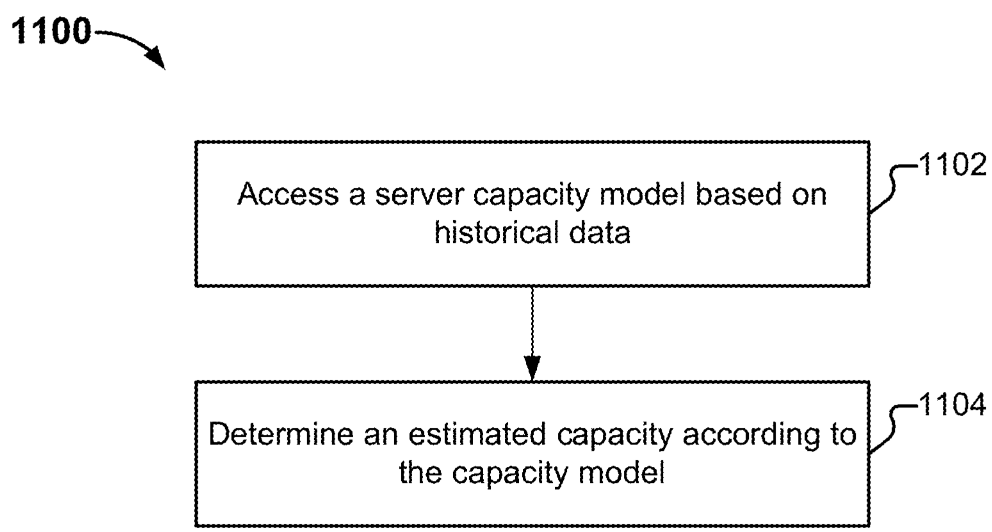
FIG. 11 is a flowchart illustrating an embodiment of a process for estimating a server's capacity based on latency.

FIG. 11 is a flowchart illustrating an embodiment of a process for estimating a server's capacity based on latency. Process 1100 can be used to determine an estimated capacity associated with a server ($C_{i,j}$) and implements 506 of process 500.

Figure 12:
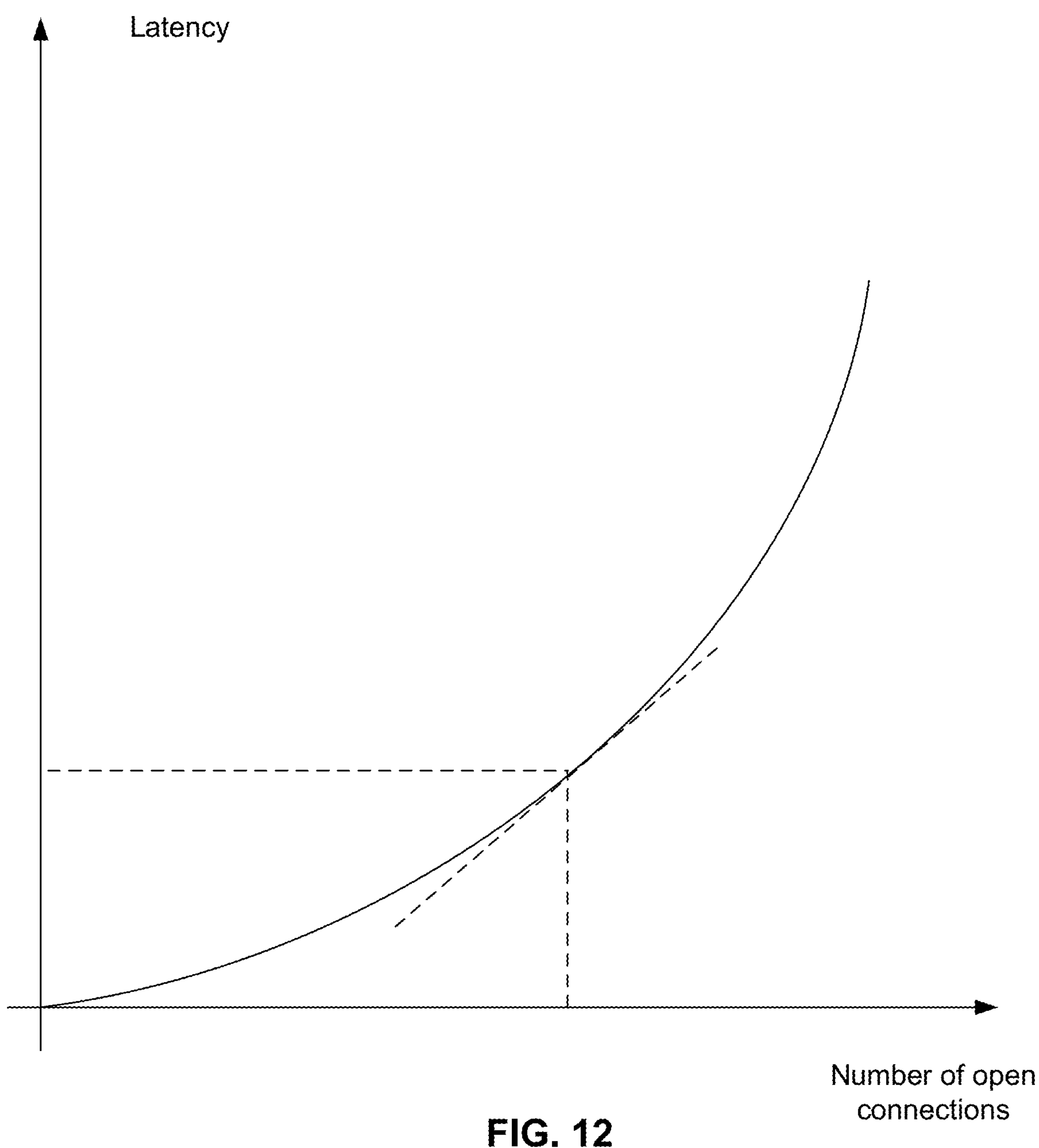
FIG. 12 is a diagram illustrating an example of a capacity model for a server.

At 1102, a server capacity model based on historical data is accessed. FIG. 12 is a diagram illustrating an example of a capacity model for a server. The model shown in this example is constructed as a plot based on historical capacity data that is recorded by the service engine. In this example, the X axis corresponds to the number of open connections and the Y axis corresponds to latency. In other embodiments where different capacity measurements and/or factors for determining the capacity measurements are used, the X and Y axes can correspond to different measurements and factors, respectively. In FIG. 12, a two-dimensional plot is constructed because the capacity is determined based on a single factor, namely latency. In embodiments where multiple factors are used to determine the capacity, a multidimensional model can be constructed and used to locate the estimated capacity.

Returning to FIG. 11, at 1104, an estimated capacity is determined according to a threshold associated with the capacity model. In this example, the estimated capacity is the number of open connections that corresponds to a threshold according to the capacity model. Referring again to FIG. 12, given a latency value, a corresponding number of open connections can be looked up on the plot. A latency threshold is used to estimate the capacity. In some embodiments, a latency threshold is set to a specific value (e.g., an empirical latency value beyond which the performance is deemed to be unacceptable). As can be seen in the plot, for a given server, the latency increases exponentially as the number of open connections increases. Thus, in some embodiments, the latency threshold is determined based on the rate of change in latency with respect to the number of open connections (e.g., the derivative (slope) of the curve). Specifically, the estimated capacity equals the number of open connections corresponding to the location on the plot where the slope exceeds a threshold value (e.g., 2). In other embodiments, variance of latency, latency at a percentile of completed requests (e.g., latency for 90% of completed requests), etc. can be used to determine the latency threshold.

In the examples above, server capacity is determined based on latency and/or rate of change in latency with respect to the number of open connections. In some embodiments, server capacity can be determined based on SLA constraints such as Application Performance Index (Apdex), an open standard metric based on connection quality, or request latency. Similar to the latency-based model discussed above, a server capacity model based on historical Apdex data can be constructed. In particular, a plot similar to FIG. 12 can be generated, with the X axis corresponding to number of open connections and the Y axis corresponding to the Apdex value. A predefined threshold Apdex value or a predefined threshold rate of change in the Apdex value can be used to determine the corresponding capacity in connection with the model.

Another way to measure capacity is to measure rate of change of Apdex and plot it on the saturation curves like $1/(1-x)$. Apdex measures the distribution of load across latencies which is a second order derivative on average latency-based capacity estimation. This can be in addition to the threshold-based check as described above.

In some embodiments, server capacity is determined based on errors such as number of failed connections, number of connections that have exceeded a threshold number of retransmissions, number of connections whose window size is zero, number of HTTP errors, etc.

For a web server that supports HTTP, there can be situations in which the server immediately responds to an HTTP request from the client but delays the actual processing of the request by placing the request in an internal queue. For example, in response to a request to process a transaction, an acknowledgement can be sent immediately, even though there is a deep queue of transactions waiting to be processed. Thus, although the HTTP request latency is small, the application workload is not reflected in the HTTP request latency. In some embodiments, a special HTTP header is added to provide more accurate information regarding the server's capacity.

Figure 13:
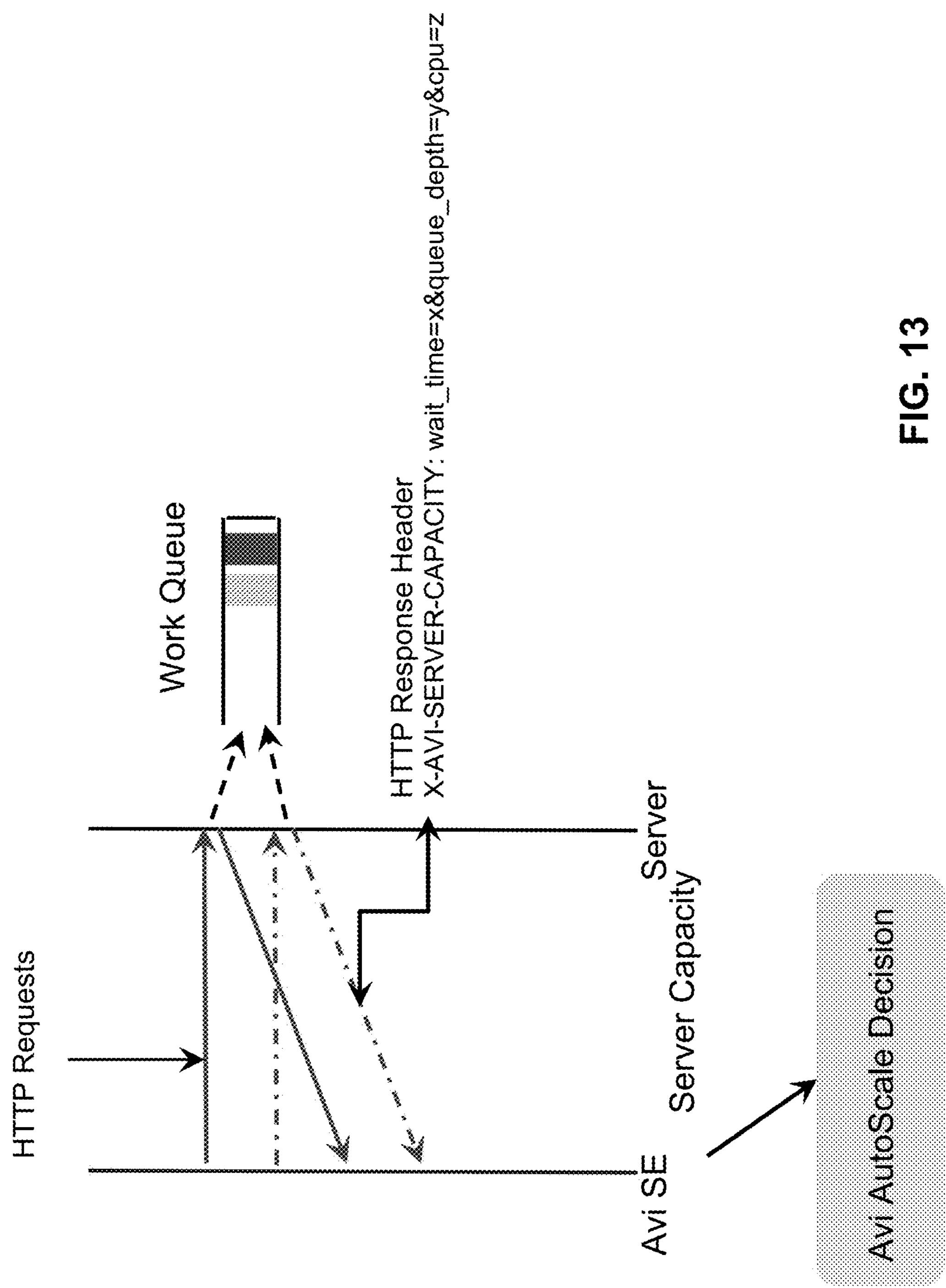
FIG. 13 is a diagram illustrating an embodiment of a system that supports a special header for estimating server capacity.

FIG. 13 is a diagram illustrating an embodiment of a system that supports a special header for estimating server capacity. Upon receiving a request, a system supporting the special header responds back with capacity-related operation information such as queue depth, wait time before the thread processes a new incoming connection, wait time for the next thread in scheduler queue, CPU utilization, memory utilization, IO wait queue, etc. The header (e.g., X-AVI-SERVER-CAPACITY) and its data fields can be added to the response and returned to the service engine by the server or by a customized application. This way, the service engine will be able to collect more accurate capacity-related operation information and better facilitate the autoscale decision. When the response is forwarded to the client, the service engine will remove this special HTTP header so the response received by the client will not contain this special header.

A server can have processing costs (e.g., response times) associated with different types of requests. The processing costs can vary depending on the underlying operation being performed, such as whether the operation is a read operation or a write operation, whether the data being read is stored in memory or on disk, whether a database access operation requires a global software lock or a fine grained lock, the amount of processing required to perform the operation, etc. In some embodiments, the requests being serviced are categorized based on their processing costs (e.g., read or write requests, fast or slow Universal Resource Identifiers (URIs), etc.) and server capacity is determined based on measurements associated with different categories.

Figure 14:
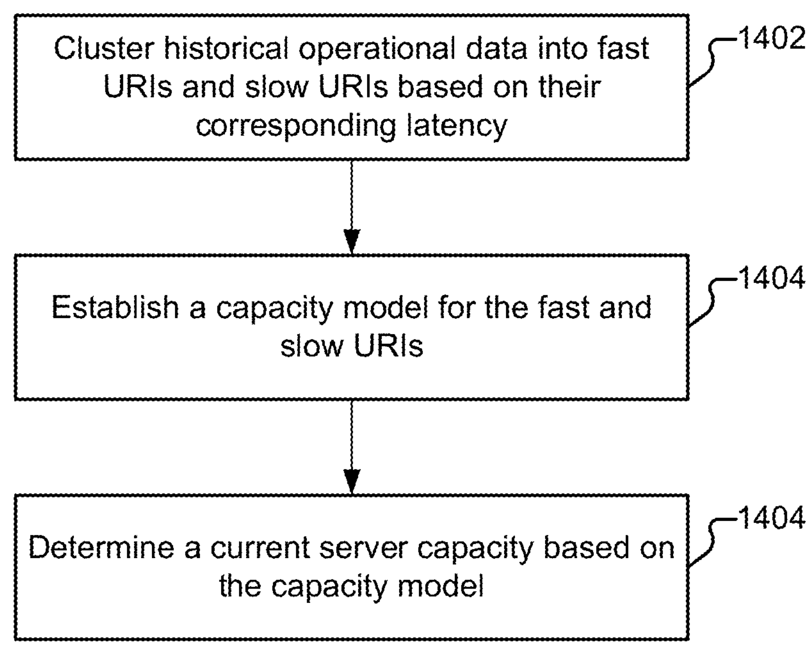
FIG. 14 is a flowchart illustrating another embodiment of a process for capacity estimation.

FIG. 14 is a flowchart illustrating another embodiment of a process for capacity estimation. Process 1400 can be used to determine an estimated capacity associated with a server ($C_{i,j}$) that provides a web service and to implement 506 of process 500.

At 1402, historical operational data (URIs and their corresponding latencies) is clustered into multiple categories (e.g., fast URIs and slow URIs) based on the historical operational data's corresponding performance metrics. In this example, the latency measured as the time to access the first byte in the response is used as the performance metric. A clustering algorithm such as k-means clustering, expectation-maximization clustering, etc. can be applied to perform the clustering. Although two clusters (e.g., fast URIs and slow URIs) are formed in this example, other embodiments can form different numbers of clusters.

Figure 15:
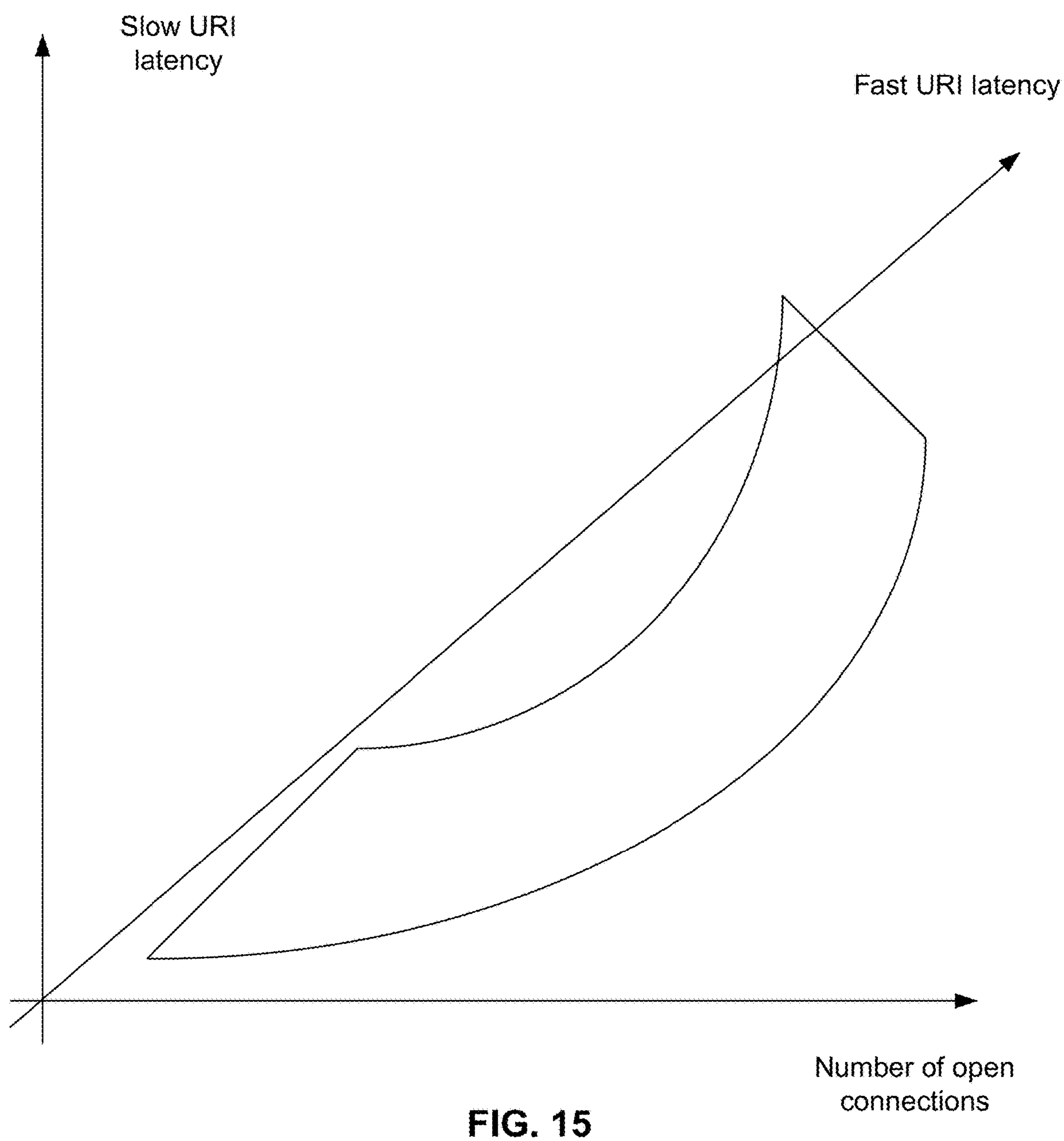
FIG. 15 is a diagram illustrating an example of a capacity model that accounts for slow and fast URIs.

At 1404, a capacity model is established for the categories. In this example, the categories include fast and slow URIs, and the capacity value is represented as a two-tuple value $C_i(L_{si}, L_{fi})$, where $L_{si}$ corresponds to the latency for slow URIs and $L_{fi}$ corresponds to the latency for fast URIs. FIG. 15 is a diagram illustrating an example of a capacity model that accounts for slow and fast URIs. In this example, the X axis corresponds to the number of open connections and the Y and Z axes correspond to latency for slow URIs and latency for fast URIs, respectively. The capacity model forms a three-dimensional surface.

At 1406, server capacity is determined based on the capacity model. Specifically, given the latencies for slow URIs and fast URIs, the number of connections can be looked up. Similar to the 2-dimensional model of FIG. 12, a threshold can be set. The threshold can be determined based on a specific two-tuple latency value or a rate of change in two-dimensional latencies (e.g., a derivative of the surface).

In this example, the expected load is also represented as a two-tuple value, $E_i(L_{si},L_{fi})$, and is the greater of the predicted load and the current load in terms of vector length. The predicted load can be determined using techniques similar to the techniques for determining predicted load for one type of URI described above (e.g., historical moving average, Holt-Winters, etc.), with 2-dimensional historical data measured in slow and fast URIs.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of performing an autoscale operation to adjust a set of target-application servers that receive data message flows from a set of clients through a plurality of service engines, the service engines maintaining operational data regarding the data message flows forwarded by the service engines to the set of servers, the method comprising:

collecting, from the plurality of service engines, operational data associated with a set of target-application servers to which the plurality of service engines forwards data message flows;

calculating an expected load on the set of target-application servers based on the collected operational data;

calculating an expected operational capacity of the set of target-application servers based on capacity data received at the plurality of service engines in headers of data messages from the set of target-application servers processed by the plurality of service engines;

based at least in part on the calculated expected load and capacity, determining that an autoscale operation is to be performed to add one or more additional target-application servers to, or remove one or more target-application servers from, the set of target-application servers; and performing the autoscale operation.

2. The method of claim 1, wherein calculating the expected load comprises calculating a range of a plurality of load values and selecting one of the values in the range as the expected load.

3. The method of claim 2, wherein selecting the value comprises selecting a highest value in the range.

4. The method of claim 3, wherein calculating the range comprises calculating a variance of historical load data in the previously collected operational data and using the calculated variance and a predicted load value to define the range.

5. The method of claim 4, wherein calculating the variance of historical load data comprises:

aggregating the operational data associated with the set of target-application servers;

determining a historical moving average based at least in part on the aggregated operational data;

constructing a distribution model based at least in part on the historical moving average; and calculating the variance based at least in part on the distribution model, wherein the predicted load value is a value selected from the constructed distributed model.

6. The method of claim 5, wherein the value selected from the constructed distributed model is a most likely value in the distribution model.

7. The method of claim 2, wherein the range is calculated based on Holt-Winters algorithm.

8. The method of claim 1, wherein the expected operational capacity is calculated based at least in part on one or more of: number of open connections, average number of requests/second, average number of connections/second, bandwidth, latency, connection quality, errors, service level agreement (SLA) constraints, and Application Performance Index (Apdex).

9. The method of claim 1, wherein the capacity data in the headers comprises at least one of queue depth, wait time before the thread processes a new incoming connection, wait time for the next thread in scheduler queue, CPU utilization, memory utilization, and IO wait queue.

10. The method of claim 1, wherein the expected operational capacity is calculated based at least in part on a threshold associated with a capacity model.

11. The method of claim 10, wherein the threshold is a threshold of a rate of change of a capacity estimation factor.

12. The method of claim 1, wherein the headers of the responses from the set of target-application servers comprise special Hypertext Transfer Protocol (HTTP) headers.

13. The method of claim 1, wherein calculating the expected operational capacity comprises:

clustering historical operational data into a plurality of categories based on performance metrics; and establishing a capacity model for the plurality of categories based at least in part on the historical operational data.

14. A non-transitory machine readable medium storing a program for execution by a set of processing units, the program for performing an autoscale operation to adjust a set of target-application servers that receive data message flows from a set of clients through a plurality of service engines, the service engines maintaining operational data regarding the data message flows forwarded by the service engines to the set of servers, the program comprising a set of instructions for:

collecting, from the plurality of service engines, operational data associated with a set of target-application servers to which the plurality of service engines forwards data message flows;

using previously collected operational data to calculate a variance in a load value expressing the load on the set of target-application servers;

using the calculated variance to calculate an expected load on the set of target-application servers;

calculating an expected operational capacity of the set of target-application servers;

based at least in part on the calculated expected load and capacity, determining that an autoscale operation is to be performed to add one or more additional target-application servers to, or remove one or more target-application servers from, the set of target-application servers; and performing the autoscale operation.

15. The non-transitory machine readable medium of claim 14, wherein the set of instructions for using the calculated variance to calculate the expected load on the set of target-application servers comprises a set of instructions for calculating a range of a plurality of load values and selecting one of the values in the range as the expected load.

16. The non-transitory machine readable medium of claim 15, wherein the set of instructions for using the calculated variance to calculate an expected load on the set of target-application servers further comprises sets of instructions for:

aggregating the operational data associated with the set of target-application servers;

determining a historical moving average based at least in part on the aggregated operational data;

constructing a distribution model based at least in part on the historical moving average;

calculating the variance based at least in part on the distribution model; and using the calculated variance and a predicted load value to define the range, wherein the predicted load value is a value selected from the constructed distributed model.

17. An autoscaling system for performing an autoscale operation to adjust a set of target-application servers that receive data message flows from a set of clients through a plurality of service engines, the service engines maintaining operational data regarding the data message flows forwarded by the service engines to the set of servers, comprising:

a non-transitory machine readable medium storing a program for execution by a set of processing units, the program comprising sets of instructions for:

collecting, from the plurality of service engines, operational data associated with a set of target-application servers to which the plurality of service engines forwards data message flows;

calculating an expected load on the set of target-application servers based on the collected operational data;

calculating an expected operational capacity of the set of target-application servers based on capacity data received at the plurality of service engines in headers of data messages from the set of target-application servers processed by the plurality of service engines;

based at least in part on the calculated expected load and capacity, determining that an autoscale operation is to be performed to add one or more additional target-application servers to, or remove one or more target-application servers from, the set of target-application servers; and performing the autoscale operation.

18. The autoscaling system of claim 17, wherein the headers of the responses from the set of target-application servers comprise special Hypertext Transfer Protocol (HTTP) headers.

19. The autoscaling system of claim 17, wherein the capacity data in the headers comprises at least one of queue depth, wait time before the thread processes a new incoming connection, wait time for the next thread in scheduler queue, CPU utilization, memory utilization, and TO wait queue.

20. The non-transitory machine readable medium product of claim 16, wherein the value selected from the constructed distributed model is a most likely value in the distribution model.

* * * * *